(12) United States Patent
Sakai et al.

(10) Patent No.: US 10,183,555 B2
(45) Date of Patent: Jan. 22, 2019

(54) ONBOARD ELECTRIC SYSTEM

(71) Applicant: DENSO CORPORATION, Kariya, Aichi-pref. (JP)

(72) Inventors: Koji Sakai, Kariya (JP); Tomoyuki Sumi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 222 days.

(21) Appl. No.: 15/037,795

(22) PCT Filed: Nov. 7, 2014

(86) PCT No.: PCT/JP2014/005596
§ 371 (c)(1),
(2) Date: May 19, 2016

(87) PCT Pub. No.: WO2015/075883
PCT Pub. Date: May 28, 2015

(65) Prior Publication Data
US 2016/0303948 A1      Oct. 20, 2016

(30) Foreign Application Priority Data
Nov. 20, 2013   (JP) .................... 2013-240078

(51) Int. Cl.
*B60L 1/00*      (2006.01)
*H02G 3/00*      (2006.01)
(Continued)

(52) U.S. Cl.
CPC ......... *B60H 1/3225* (2013.01); *B60H 1/3222* (2013.01); *B60L 1/003* (2013.01);
(Continued)

(58) Field of Classification Search
CPC . Y02T 10/70; Y02T 10/7233; Y02T 10/7066; Y02T 10/645; Y02T 10/644;
(Continued)

(56) References Cited

U.S. PATENT DOCUMENTS

| 8,742,718 B2 * | 6/2014 | Sugiyama | ............... B60L 3/003 307/10.1 |
| 2010/0214055 A1 * | 8/2010 | Fuji | ............... B60L 3/00 340/3.1 |

(Continued)

FOREIGN PATENT DOCUMENTS

| JP | H06276610 A | 9/1994 |
| JP | 3289567 B2 | 6/2002 |

(Continued)

OTHER PUBLICATIONS

U.S. Appl. No. 15/037,763, filed May 19, 2016, Sakai.

*Primary Examiner* — Alfonso Perez Borroto
*Assistant Examiner* — Esayas Yeshaw
(74) *Attorney, Agent, or Firm* — Harness, Dickey & Pierce, P.L.C.

(57) ABSTRACT

An onboard electric system includes a drive circuit that drives an electric motor based on an output voltage of a direct current power supply; a first smoothing capacitor; a drive signal generator; a first discharge resistor that is connected between a positive electrode and a negative electrode of the first smoothing capacitor; a first discharge switcher that is connected in series to the first discharge resistor between the positive electrode and the negative electrode, and releases or makes a connection between the positive electrode and the negative electrode; and an off-signal generator that outputs an off signal to the first discharge switcher. The first discharge switcher is provided by a switcher of a normally-ON type that makes the connection between the positive electrode and the negative electrode (Continued)

through the first discharge resistor in a period other than a period while the off-signal generator provides the off signal.

17 Claims, 13 Drawing Sheets

(51) Int. Cl.
  *B60H 1/32* (2006.01)
  *B60L 3/00* (2006.01)
  *B60L 3/04* (2006.01)
  *B60L 11/18* (2006.01)
  *B60L 15/00* (2006.01)

(52) U.S. Cl.
  CPC .............. *B60L 3/0023* (2013.01); *B60L 3/04* (2013.01); *B60L 11/1803* (2013.01); *B60L 11/1868* (2013.01); *B60L 15/007* (2013.01); B60H 2001/3266 (2013.01); B60H 2001/3292 (2013.01); B60L 2210/12 (2013.01); B60L 2220/14 (2013.01); B60L 2220/16 (2013.01); B60L 2240/36 (2013.01); B60L 2240/525 (2013.01); B60L 2240/527 (2013.01); B60L 2240/529 (2013.01); B60L 2240/545 (2013.01); B60L 2240/547 (2013.01); B60L 2240/549 (2013.01); B60L 2270/20 (2013.01); Y02T 10/644 (2013.01); Y02T 10/645 (2013.01); Y02T 10/7005 (2013.01); Y02T 10/7066 (2013.01); Y02T 10/7233 (2013.01)

(58) Field of Classification Search
  CPC .......... B60L 1/003; B60L 3/0023; B60L 3/04; B60L 11/1803; B60L 11/1868; B60L 15/007; B60L 2210/12; B60L 2220/14; B60L 2220/16; B60L 2240/36
  See application file for complete search history.

(56) References Cited

U.S. PATENT DOCUMENTS

| | | | |
|---|---|---|---|
| 2012/0063044 A1* | 3/2012 | Fukuyama | B60L 3/00 361/62 |
| 2013/0039108 A1 | 2/2013 | Watanabe et al. | |
| 2013/0116871 A1 | 5/2013 | Hashimoto | |
| 2013/0268158 A1* | 10/2013 | Kurita | B60L 3/00 701/32.8 |
| 2014/0071578 A1* | 3/2014 | Mirzaei | B60L 7/08 361/196 |
| 2014/0091619 A1* | 4/2014 | Yoshimi | B60L 3/0092 307/10.1 |
| 2014/0095005 A1* | 4/2014 | Kanzaki | B60L 11/1803 701/22 |
| 2014/0210260 A1 | 7/2014 | Hirose | |
| 2014/0309827 A1* | 10/2014 | Kanzaki | B60L 3/04 701/22 |
| 2015/0034406 A1* | 2/2015 | Hirose | B60L 3/0046 180/279 |
| 2015/0097501 A1* | 4/2015 | Yamane | B60L 1/00 318/400.3 |
| 2015/0217648 A1* | 8/2015 | Ichikawa | B60L 11/182 320/108 |
| 2015/0343904 A1* | 12/2015 | Ikeyama | B60L 3/0007 701/22 |

FOREIGN PATENT DOCUMENTS

| | | |
|---|---|---|
| JP | 2009254169 A | 10/2009 |
| JP | 2013038895 A | 2/2013 |
| JP | 2013102580 A | 5/2013 |
| JP | 2013198256 A | 9/2013 |
| JP | 2013236451 A | 11/2013 |
| JP | 2014125127 A | 7/2014 |
| JP | 2014147205 A | 8/2014 |
| JP | 2015019561 A | 1/2015 |

* cited by examiner

ONBOARD ELECTRIC SYSTEM

CROSS-REFERENCE TO RELATED APPLICATIONS

This application is a U.S. National Phase Application under 35 U.S.C. 371 of International Application No. PCT/JP2014/005596 filed on Nov. 7, 2014 and published in Japanese as WO 2015/075883 A1 on May 28, 2015. This application is based on and claims the benefit of priority from Japanese Patent Application No. 2013-240078 filed on Nov. 20, 2013. The entire disclosures of all of the above applications are incorporated herein by reference.

TECHNICAL FIELD

The present disclosure relates to an onboard electric system that drives a motor based on an output voltage of a direct current (DC) power supply.

BACKGROUND ART

An onboard electric system includes: an inverter circuit that outputs an alternating current (AC) to a motor based on an output voltage of a high voltage power supply; a smoothing capacitor that stabilizes a voltage applied between two electric power input electrodes of the inverter circuit from the high voltage power supply; and an electronic control apparatus that controls the inverter circuit based on the output voltage of a low voltage power supply (referring to, for example, Patent document 1).

In this onboard electric system, the electronic control apparatus outputs a discharge control signal to the inverter circuit while a connection between the high voltage power supply and the smoothing capacitor is released by a relay unit. The inverter circuit outputs current to a stator coil of the electric motor based on the output voltage of the smoothing capacitor. In this way, the smoothing capacitor discharges its electric charge through the inverter circuit and the stator coil.

The inventors of the present application have found the following relating to an onboard electric system.

In the onboard electric system of Patent document 1, when an abnormal state happens in a vehicle and the voltage is not outputted to the inverter circuit from the low voltage power supply, the electronic control apparatus cannot output the discharge control signal to the inverter circuit. Therefore, the smoothing capacitor cannot discharge its electric charge through the inverter circuit and the stator coil.

RELATED ART LITERATURE

Patent Document

Patent document 1: Japanese Patent No. 3289567

SUMMARY OF INVENTION

It is an object of the present disclosure to provide an onboard electric system that causes a smoothing capacitor to discharge electric charge when an abnormal state happens.

An onboard electric system according to one mode of the present disclosure comprises: a drive circuit that drives an electric motor mounted to a vehicle based on an output voltage of a direct current power supply; a first smoothing capacitor that stabilizes the output voltage applied between two power input electrodes of the drive circuit from the direct current power supply; a drive signal generator that outputs to the drive circuit, a control signal controlling the drive circuit, causing the electric motor to be driven based on the output voltage of the direct current power supply; a first discharge resistor that is connected between a positive electrode and a negative electrode of the first smoothing capacitor; a first discharge switcher that is connected in series to the first discharge resistor between the positive electrode and the negative electrode of the first smoothing capacitor, and releases or makes a connection between the positive electrode and the negative electrode of the first smoothing capacitor; and an off-signal generator that outputs to the first discharge switcher, an off signal causing the first discharge switcher to release the connection between the positive electrode and the negative electrode of the first smoothing capacitor. The first discharge switcher is provided by a switcher of a normally-ON type that makes the connection between the positive electrode and the negative electrode of the first smoothing capacitor through the first discharge resistor in a period other than a period while the off-signal generator provides the off signal.

According to the onboard electric system of the present disclosure, when an abnormal state happens and the off signal from the off-signal generator cannot be given to the first discharge switcher, the first discharge switcher automatically makes the connection between the positive electrode and the negative electrode of a first smoothing capacitor through the first discharge resistor. When the abnormal state happens, it may be possible to discharge the electric charge from the first smoothing capacitor.

BRIEF DESCRIPTION OF DRAWINGS

The above and other aspects, features and advantages of the present disclosure will become more apparent from the following detailed description made with reference to the accompanying drawings. In the drawings.

EMBODIMENT FOR CARRYING OUT INVENTION

Figure 1:
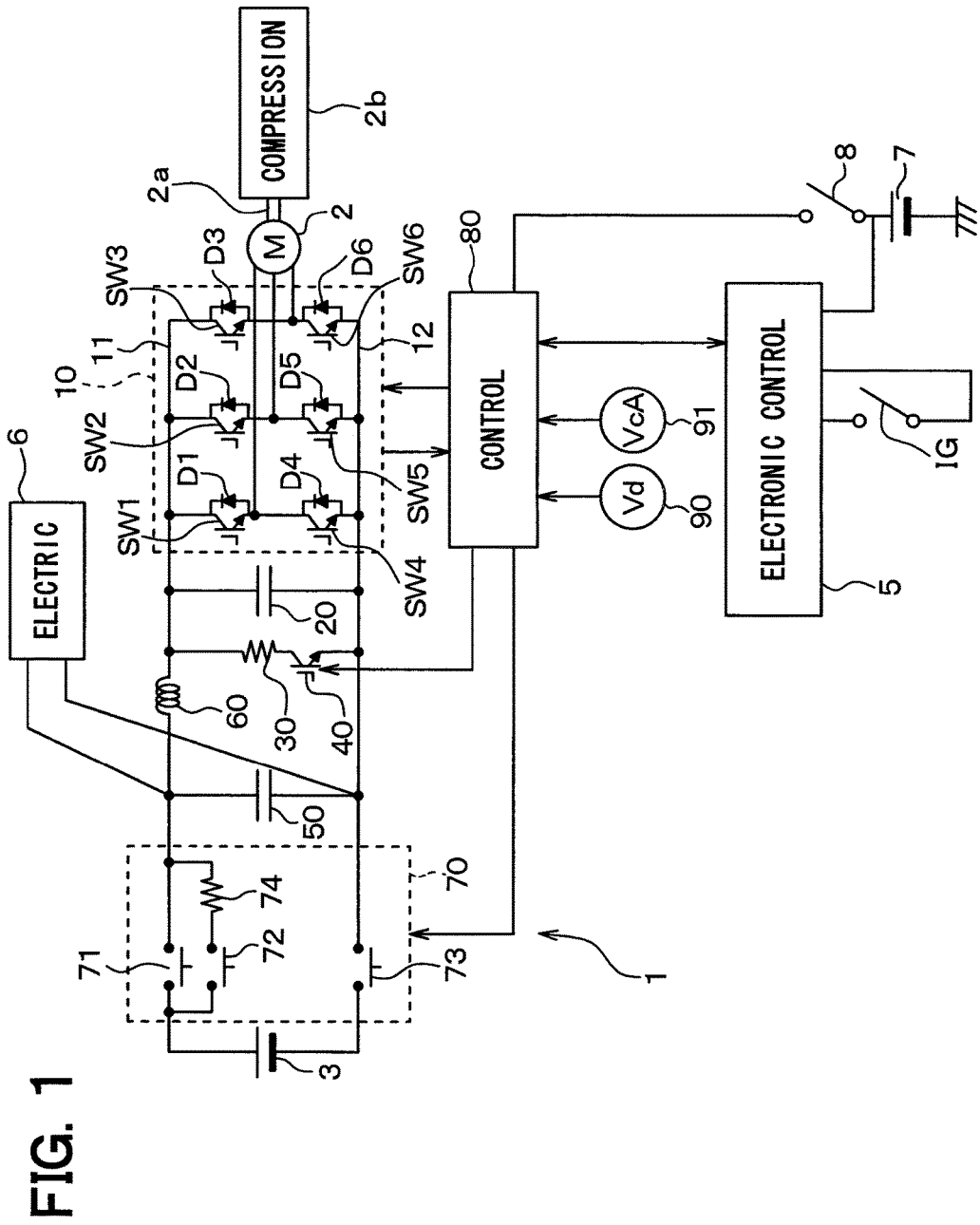
FIG. 1 is a diagram to illustrate an overall configuration of an onboard electric system in a first embodiment of the present disclosure.

Hereinafter, embodiments of the present disclosure will be described with reference to the drawings. In the respective embodiments, parts equal or equivalent to each other are denoted by the same reference symbols in the drawings so as to simplify their descriptions.

First Embodiment

An electric configuration of a first embodiment of an onboard electric system 1 according to the present disclosure will be shown in FIG. 1.

The onboard electric system 1 drives a three-phase alternating current (AC) motor 2 based on an output voltage of a high voltage power supply 3. The three-phase AC motor 2 corresponds to an electric motor of the present disclosure, and the high voltage power supply 3 corresponds to a direct current (DC) power supply. The three-phase AC motor 2 is connected to a compression mechanism 2b via a coupling shaft 2a. The high voltage power supply 3 is a DC battery device of high voltage, and is a DC power supply the output voltage (for example, 300 V) of which is higher than an output voltage (for example, 12 V) of a low voltage power supply 7. The three-phase AC motor 2, the coupling shaft 2a, and the compression mechanism 2b configures an electric compressor that compresses a cooling medium. The electric compressor is one of main parts configuring an onboard air-conditioner refrigeration cycle apparatus for circulating the cooling medium. A synchronous AC motor, for example, is used as the three-phase AC motor 2. As a stator coil (not shown in the drawing) of the three-phase AC motor 2 is used, for example, a coil of a star type connection in which a U-phase coil, a V-phase coil, and a W-phase coil are connected in the shape of a star.

Specifically, the onboard electric system 1 as shown in FIG. 1 includes an inverter circuit 10, a smoothing capacitor 20, a discharge resistor 30, a discharge switching element 40, a smoothing capacitor 50, an inductor 60, a relay unit 70, and a control apparatus 80. The inverter circuit 10 corresponds to a drive circuit. The smoothing capacitor 20 corresponds to a first smoothing capacitor. The discharge resistor 30 corresponds to a first discharge resistor. The discharge switching element 40 corresponds to a first discharge switcher. The smoothing capacitor 50 corresponds to a second smoothing capacitor.

The inverter circuit 10 is a drive circuit that outputs three-phase AC current to the stator coil of the three-phase AC motor 2 based on the output voltage of the high voltage power supply 3.

The inverter circuit 10 is a known circuit including transistors SW1, SW2, SW3, SW5, SW6, and freewheeling diodes D1, D2, D3, D4, D5, D6. The transistors SW1, SW2, SW3 are connected to a positive electrode bus 11. The positive electrode bus 11 is connected to a positive electrode of the high voltage power supply 3. The transistors SW4, SW5, SW6 are connected to a negative electrode bus 12. The negative electrode bus 12 is connected to a negative electrode of the high voltage power supply 3.

The positive electrode bus 11 and the negative electrode bus 12 of the present embodiment include two power input electrodes in the inverter circuit 10.

A common connection terminal between the transistors SW1 and SW4 is connected to a U-phase coil of the stator coil of the three-phase AC motor 2. A common connection terminal between the transistors SW2 and SW5 is connected to a V-phase coil of the stator coil of the three-phase AC motor 2. A common connection terminal between the transistors SW3 and SW6 is connected to a W-phase coil of the stator coil of the three-phase AC motor 2. As the transistors SW1, SW2, SW3, SW4, SW5, SW6, various semiconductor switching elements such as an IGBT (Insulated Gate Bipolar Transistor) may be used.

The smoothing capacitor 20 is connected between the positive electrode bus 11 and the negative electrode bus 12, and stabilizes voltage applied between the positive electrode bus 11 and the negative electrode bus 12 from the high voltage power supply 3.

The discharge resistor 30 is a resistance element connected between the positive electrode bus 11 and the negative electrode bus 12. The discharge switching element 40 is a switching element connected in series to the discharge resistor 30 between the positive electrode bus 11 and the negative electrode bus 12.

The discharge switching element 40 is an element of a normally-ON type, which turns into an on state in a period other than a period during which an off signal is given from the control apparatus 80, to connect between the positive electrode bus 11 and the negative electrode bus 12 via the discharge resistor 30.

In the present embodiment, a semiconductor device such as a GaN device of a normally-ON type is used as the discharge switching element 40. A contact relay (that is, a mechanical relay) having a contact may be used as the discharge switching element 40.

The smoothing capacitor 50 is connected in parallel to the smoothing capacitor 20 between the positive electrode bus 11 and the negative electrode bus 12 of the high voltage power supply 3. The smoothing capacitor 50 is arranged on a side of a high voltage power supply 3 with respect to the inverter circuit 10, the smoothing capacitor 20, the discharge resistor 30, and the discharge switching element 40. The smoothing capacitor 50 stabilizes voltage outputted between two power input electrodes of the electric device 6 from the high voltage power supply 3.

The electric device 6 includes, for example, a drive circuit for electric motor of travelling. The drive circuit for electric motor of travelling includes a DC/DC converter circuit, which lowers and outputs an input voltage, and an inverter circuit, which drives an electric motor for travelling.

Incidentally, a positive electrode of the high voltage power supply 3 is connected to the power input electrode on a positive electrode side of the electric device 6. A negative electrode of the high voltage power supply 3 is connected to the power input electrode on a negative electrode side of the electric device 6.

The inductor 60 is a normal coil arranged between a positive electrode of the smoothing capacitor 20 and a positive electrode of the smoothing capacitor 50. The inductor 60 restrains a ripple current from flowing from the smoothing capacitor 50 to the smoothing capacitor 20.

Incidentally, the inductor 60 may be configured by a coil component of a wiring between the positive electrode of the smoothing capacitor 20 and the positive electrode of the smoothing capacitor 50. A common coil (not shown) may be arranged between the smoothing capacitors 20, 50 of the present embodiment.

The relay unit 70 is arranged between the smoothing capacitor 50 and the high voltage power supply 3. The relay unit 70 is arranged to a side of the high voltage power supply 3 with respect to the inverter circuit 10, the smoothing capacitors 20, 50, the discharge resistor 30, the discharge switching element 40, and the inductor 60. The relay unit 70 includes relays 71, 72, 73, and a resistance element 74.

The relays 71, 72 are relay switches arranged in parallel between a positive electrode of the high voltage power supply 3 and a positive electrode of the smoothing capacitor 50. The relay 73 is a relay switch arranged between a negative electrode of the high voltage power supply 3 and a negative electrode of the smoothing capacitor 50. Incidentally, the resistance element 74 is connected in series to the relay 72 between the positive electrode of the high voltage power supply 3 and the positive electrode of the smoothing capacitor 50. The resistance element 74 is used so as to prevent an inrush current from flowing through the smoothing capacitors 20, 50 from the high voltage power supply 3 when the relay 72 connects the positive electrode of the high voltage power supply 3 and the positive electrode of the smoothing capacitor 50.

The control apparatus 80 controls the inverter circuit 10 based on a command signal outputted from the electronic control apparatus 5, a detection value of a temperature sensor, a detection value of a current sensor, and a detection value of a voltage sensor. The temperature sensor is a sensor that senses an ambient temperature of the inverter circuit 10. The current sensor is a sensor that senses a current outputted from the stator coil of the three-phase AC motor 2. The voltage sensor is a sensor that senses a voltage between the positive electrode bus 11 and the negative electrode bus 12.

The control apparatus 80 controls the relay unit 70 and the discharge switching element 40 based on an abnormal signal outputted from the electronic control apparatus 5, an output signal of an ignition switch IG, and output voltages of voltage sensors 90, 91. The voltage sensor 90 is a sensor sensing a voltage Vd between two electrodes of the discharge resistor 30. The voltage sensor 91 is a sensor sensing a voltage VcA between the positive electrode and the negative electrode of the smoothing capacitor 20. The voltage sensor 90 corresponds to a voltage sensor.

The abnormal signal includes, for example, a collision flag. The collision flag is a flag to show a result that the electronic control apparatus 5 determines whether a collision occurred in a vehicle according to a detection result of an acceleration sensor. The ignition switch IG is a starting switch operated so as to start a drive source for travelling. As the travelling drive source of the present embodiment is used at least one of a travelling engine and a travelling motor. A relay switch 8 is connected between the positive electrode of the low voltage power supply 7 and the control apparatus 80. In other words, the control apparatus 80 is supplied electric power from the low voltage power supply 7 via the relay switch 8. The electronic control apparatus 5 controls the relay switch 8.

Incidentally, the control apparatus 80 and the electronic control apparatus 5 of the present embodiment operate based on the output voltage of the low voltage power supply 7.

Figure 2:
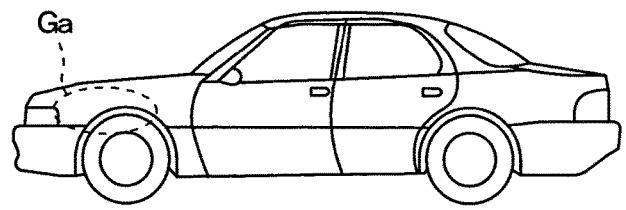
FIG. 2 is a diagram showing a position in which an electric compressor is mounted in the first embodiment.

The inverter circuit 10, the smoothing capacitors 20, 50, the discharge resistor 30, the discharge switching element 40, the inductor 60, the relay unit 70, and the control apparatus 80 of the present embodiment are housed in a case configuring the electric compressor. The electric compressor is arranged on a front side in a vehicle traveling direction with respect to the travelling drive source in an engine room (referring to a reference symbol Ga in FIG. 2). The reference symbol Ga in FIG. 2 shows a position in which the electric compressor is arranged in the engine room.

An operation of the onboard electric system 1 of the present embodiment will be described.

An operation when the vehicle is in a normal state and an operation when the vehicle is in an abnormal state, that is, when an abnormality occurs in a vehicle, will be described separately as the description of the operation of the onboard electric system 1.

The operation of the control apparatus 80 when the vehicle is in the normal state will be described. The control apparatus 80 performs a start control processing and a stop discharge processing will be independently. Hereinafter, the start control processing and the stop discharge processing will be described separately.

(Start Control Processing)

The ignition switch IG is turned on. The electronic control apparatus 5 determines that a user performs an operation for starting the travelling drive source of the vehicle to the ignition switch IG based on the output signal of the ignition switch IG. Consequently, the electronic control apparatus 5 turns on the relay switch 8. Therefore, the output voltage of the low voltage power supply 7 is applied to the control apparatus 80. Then, the control apparatus 80 starts to operate by the output voltage of the low voltage power supply 7. The control apparatus 80 starts to perform the start control processing according to a flow chart shown in FIG. 3.

In S100, the control apparatus 80 outputs an off signal to the discharge switching element 40. The discharge switching element 40 is turned off. Therefore, a connection between the positive electrode and the negative electrode of the smoothing capacitor is released.

In S101, a voltage between two electrodes of the discharge resistor 30 (hereinafter referred to as "an inter-electrode voltage Vd"). By determining whether the inter-electrode voltage Vd is greater than a specified voltage, it is determined whether current flows through the discharge resistor 30 (S102). When the inter-electrode voltage Vd is smaller than the specified voltage, it is determined that the current does not flow through the discharge resistor 30, that is, S102 is NO. Thus, it is determined that the discharge switching element 40 is normal and releases the connection between the positive electrode and the negative electrode of the smoothing capacitor 20 to stop discharging electric charge from the smoothing capacitor 20.

In S103, relays 71, 72 of the relay unit 70 are turned on, and the high voltage power supply 3 is connected to the smoothing capacitor 50. The output voltage of the high voltage power supply 3 is outputted to the electric device 6 and the inverter circuit 10. At this time, the smoothing capacitor 20 stabilizes a voltage between the positive electrode bus 11 and the negative electrode bus 12 of the inverter circuit 10. The smoothing capacitor 50 stabilizes a voltage between two power input electrodes.

In the S104, a three-phase voltage command wave is calculated based on the command signal outputted from the electronic control apparatus 5, the detection value of the temperature sensor, the detection value of the current sensor, and the detection value of the voltage sensor. The transistors SW1, SW2, . . . , SW6 of the inverter circuit 10 are controlled according to a comparison between the three-phase voltage command wave and a carrier wave.

The carrier wave of the present embodiment is a triangle wave the voltage of which changes to a positive side and to a negative side from a reference potential. The frequency of the carrier wave is changed according to a command from the electronic control apparatus.

When the transistors SW1, SW2, . . . , SW6 of the inverter circuit 10 are controlled by the control apparatus 80 in this way, the inverter circuit 10 outputs the three-phase AC current to the stator coil of the three-phase AC motor 2 based on the output voltage of the smoothing capacitor 20. Therefore, a rotating magnetic field is generated in the stator coil. A rotor is rotated in synchronization with the rotating magnetic field.

When the inter-electrode voltage Vd sensed by the voltage sensor 90 is equal to or more than the specified voltage in S102, it is determined that the current flows through the discharge resistor 30, that is, S102 is YES. In this case, it is determined that the discharge switching element 40 is abnormal and that the positive electrode of the smoothing capacitor 20 is connected to the negative electrode of the smoothing capacitor 20. Thus, it is determined that the electric charge is discharged from the smoothing capacitor 20. In this case, an abnormal signal showing an abnormal flag is outputted to the electronic control apparatus 5 (S105). The abnormal flag is a flag showing that the discharge switching element 40 is abnormal. The relay unit 70 prohibits the high voltage power supply 3 and the smoothing capacitor 50 from being connected to each other (S106).

(Stop Discharge Processing)

Figure 4:
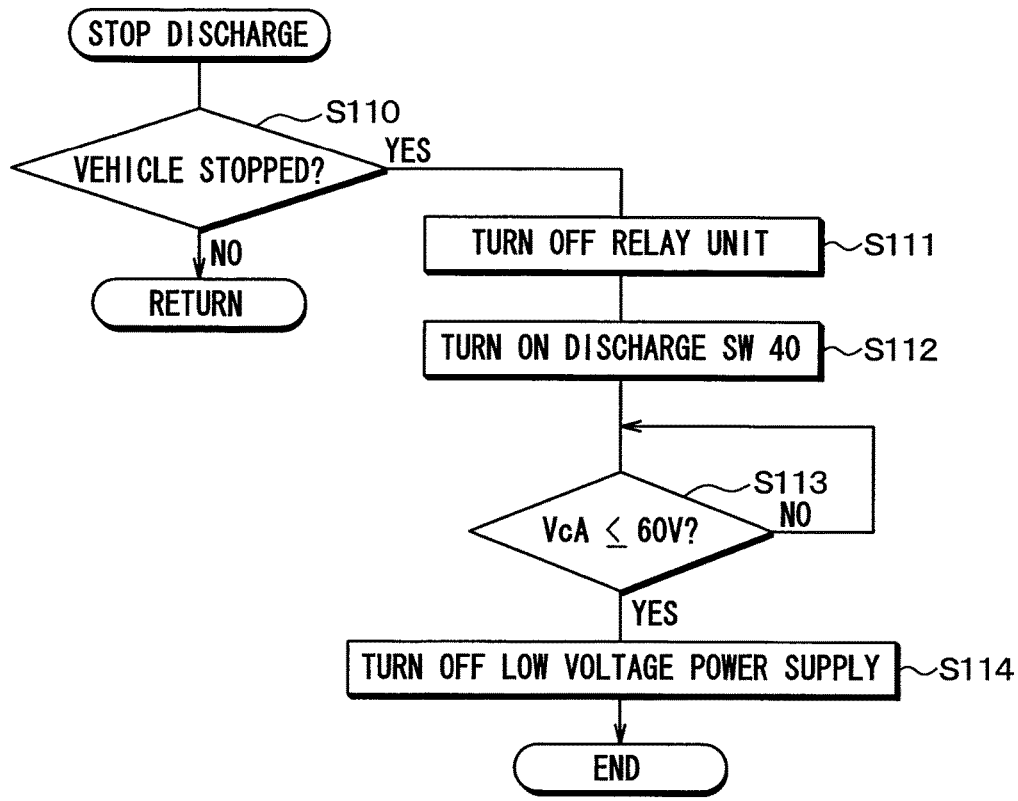
FIG. 4 is a flow chart showing a stop discharge processing of the control apparatus in FIG. 1.

The control apparatus 80 performs a stop discharge processing according to a flow chart shown in FIG. 4. The stop discharge processing starts after an execution start of the start control processing.

In S110, it is determined based on the output signal of the ignition switch IG whether the ignition switch IG is turned off. The output signal of the ignition switch IG is given to the control apparatus 80 from the electronic control apparatus 5. When the ignition switch IG is on, it is determined that S110 is NO, and then the processing returns to S110. Therefore, as long as the ignition switch IG is on, it is repeatedly determined that S110 is NO.

When the ignition switch IG is turned off, it is determined that an operation to stop the travelling drive source is performed to the ignition switch IG, that is, S110 is YES and then the processing proceeds to S111. The relays 71, 73 of the relay unit 70 are turned off to release the connection between the high voltage power supply 3 and the smoothing capacitor 50. Accordingly, the output voltage of the high voltage power supply 3 is not outputted to the electric circuit 6 and the inverter circuit 10.

In S112, an on signal is outputted to the discharge switching element 40. Therefore, the discharge switching element 40 is turned on, and the positive electrode and the negative electrode of the smoothing capacitor 20 are connected to each other via the discharge resistor 30. The electric charge is discharged from the smoothing capacitor 20 through the discharge switching element 40 and the discharge resistor 30. Therefore, the voltage VcA between the positive electrode and the negative electrode of the smoothing capacitor 20 is reduced as time passes.

Then, in the next step 113, it is determined based on the detection value of the voltage sensor 91 whether the voltage VcA between the positive electrode and the negative electrode of the smoothing capacitor 20 is equal to or less than a specified voltage (for example, 60 V). Then, when it is determined that the voltage VcA is more than the specified voltage, it is determined that S113 is NO, and then the processing returns to S113. Therefore, when it is determined that the voltage VcA is more than the specified voltage, it is repeatedly determined that S113 is NO. Then, when it is determined that the voltage VcA is equal to or less than the specified voltage, it is determined that S113 is YES, and then an off signal is outputted to the relay switch 8 through the electronic control apparatus 5 (S114). Therefore, the relay switch 8 is turned off to release the connection between the low voltage power supply 7 and the control apparatus 80. The low voltage power supply 7 is stopped from applying its output voltage to the control apparatus 80.

The operation of the control apparatus 80 in the abnormal state will be described.

Figure 5:
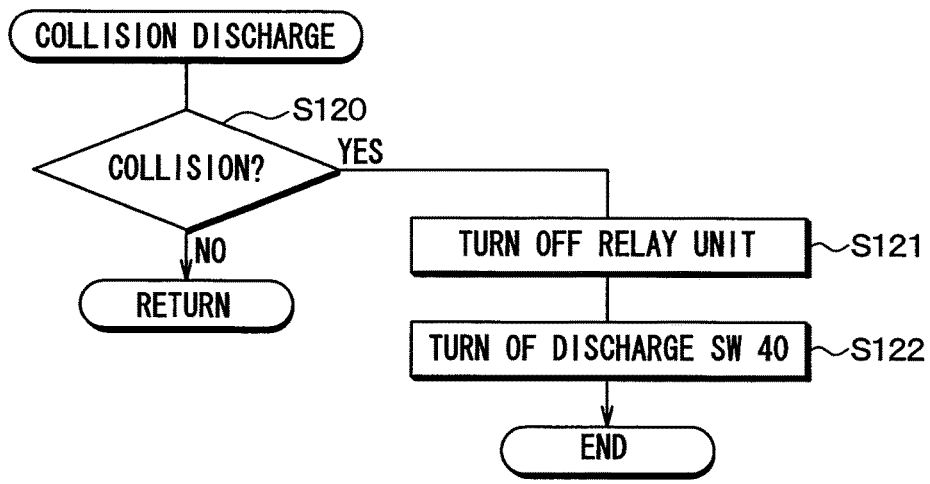
FIG. 5 is a flow chart showing a collision discharge processing of the control apparatus in FIG. 1.

The control apparatus 80 performs a collision discharge processing according to a flow chart shown in FIG. 5. The collision discharge processing and the stop discharge processing are repeatedly performed in a time-division manner after the start control processing starts to be performed.

In S120, it is determined based on an abnormal signal outputted from the electronic control apparatus 5 whether a collision is caused in the vehicle. When the collision is not caused in the vehicle, it is determined that the collision is not caused in the vehicle and that S120 is NO, and then the processing again returns to S120. Therefore, as far as the collision is not caused in the vehicle, it is repeatedly determined that step 120 is NO.

When it is determined based on the abnormal signal outputted from the electronic control apparatus 5 that a collision happens in the vehicle, it is determined that S120 is YES. In other words, it is determined that an abnormal state is caused in the vehicle. The processing proceeds to S121, and then the on signal is outputted to the discharge switching element 40. Therefore, the discharge switching element 40 is turned on to make a connection between the positive electrode and the negative electrode of the smoothing capacitor 20 through the discharge resistor 30. The electric charge is discharged from the smoothing capacitor 20 through the discharge switching element 40 and the discharge resistor 30.

It is supposed that a collision is caused in the vehicle and a harness or the like between the low voltage power supply 7 and the control apparatus 80 is cut. This case stops applying the output voltage of the low voltage power supply 7 to the control apparatus 80. In this case, the control apparatus 80 cannot operate normally, and the control apparatus 80 stops outputting an off signal to the discharge switching element 40. Thus, when the off signal is not given to the discharge switching element 40, the discharge switching element 40 is automatically brought into an on state. Accordingly, it may be possible to make the connection between the positive electrode and the negative electrode of the smoothing capacitor 20 through the discharge resistor 30 by the discharge switching element 40. Therefore, the electric charge is discharged from the smoothing capacitor 20 through the discharge switching element 40 and the discharge resistor 30.

In the present embodiment, the onboard electric system 1 includes the inverter circuit 10, which drives the three-phase AC motor 2 mounted in the vehicle based on the output voltage of the high voltage power supply 3, and the smoothing capacitor 20, which stabilizes the output voltage applied between the positive electrode bus 11 and the negative electrode bus 12 of the inverter circuit 10 from the high voltage power supply 3. The control apparatus 80 outputs the control signal, which controls the inverter circuit 10 to drive the three-phase AC motor 2 based on the output voltage of the high voltage power supply 3, to the inverter circuit 10. The onboard electric system 1 includes the discharge resistor 30, which is connected between the positive electrode and the negative electrode of the smoothing capacitor 20, and the discharge switching element 40, which is connected in series to the discharge resistor 30 between the positive electrode and the negative electrode of the smoothing capacitor 20. The control apparatus 80 outputs the off signal, which releases the connection between the positive electrode and the negative electrode of the smoothing capacitor 20, to the discharge switching element 40. The discharge switching element 40 is a switching element of the normally-ON type, which makes the connection between the positive electrode and the negative electrode of the smoothing capacitor 20 through the discharge resistor 30.

The onboard electric system 1 has an active discharge function in which, when the abnormal state happens and the off signal from the control apparatus 80 is not given to the discharge switching element 40, the discharge switching element 40 automatically becomes the on state to make the connection between the positive electrode and the negative electrode of the smoothing capacitor 20 through the discharge resistor 30. Even when the abnormal state happens, it may be possible to discharge the electric charge from the smoothing capacitor 20.

Second Embodiment

In the present embodiment, an example in which a resistance element 100, which discharges the electric charge of the smoothing capacitor 20, is added to the onboard electric system 1 of the first embodiment will be described.

Figure 6:
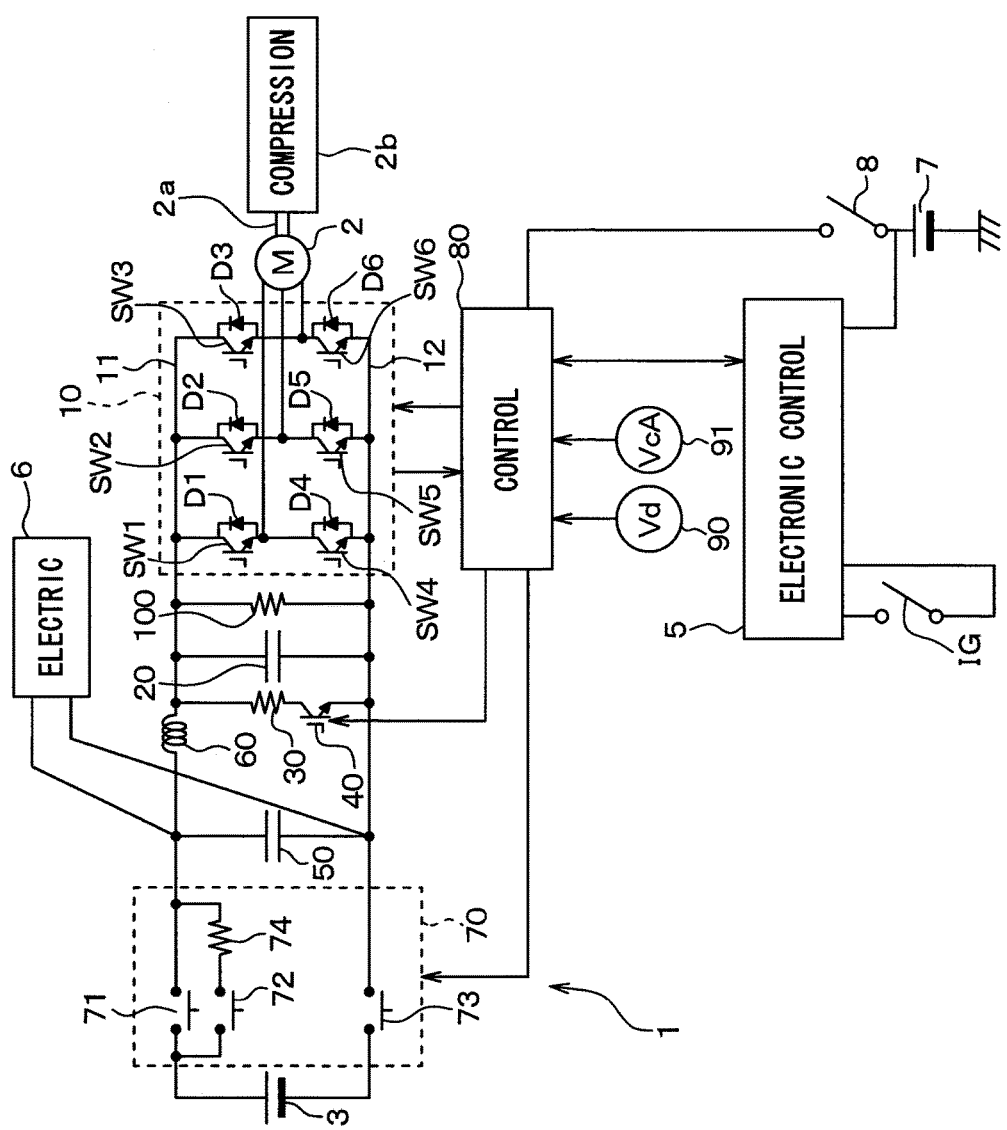
FIG. 6 is a diagram illustrating an overall configuration of an onboard electric system in a second embodiment of the present disclosure.

An overall configuration of an onboard electric system 1 in the present embodiment will be shown in FIG. 6. A discharge resistor 100 is a resistance element arranged between the positive electrode and the negative electrode of the smoothing capacitor 20. The discharge resistor 100 is arranged between the smoothing capacitor 20 and an inverter circuit 10. A time constant of a closed circuit including the smoothing capacitor 20 and the discharge resistor 100 is greater than a time constant of a closed circuit including the smoothing capacitor 20, a discharge switching element 40, and a discharge resistor 30. The discharge resistor 100 corresponds to a resistance element.

Incidentally, in the present embodiment, in a state where electric charge is stored in the smoothing capacitors 20, 50, the electric charge of the smoothing capacitors 20, 50 is always discharged through the discharge resistor 100, and the discharge resistor 100 generates heat. Therefore, a resistance element that does not cause an abnormality by the heat is required as the discharge resistor 100.

An outline of the operation of the present embodiment will be described.

Relays 71, 73 of the relay unit 70 are turned on, and a high voltage power supply 3 outputs an output voltage to the smoothing capacitors 20, 50. At this time, the electric charge from the smoothing capacitor 20 is discharged through the discharge resistor 100 and the smoothing capacitor 20 stabilizes a voltage between a positive electrode bus 11 and a negative electrode bus 12 of the inverter circuit 10. The smoothing capacitor 50 stabilizes a voltage between two power input electrodes of an electric device 6.

The inverter circuit 10 switches transistors SW1, SW2, . . . , SW6 according to a control signal from the control apparatus 80. Therefore, the inverter circuit 10 outputs three-phase AC currents to a stator coil of a three-phase AC motor 2 based on a voltage applied by the smoothing capacitor 20. Therefore, a rotating magnetic field is generated in the stator coil. A rotor is rotated in synchronization with the rotating magnetic field.

A control processing of the control apparatus 80 of the present embodiment will be described.

The control processing of the control apparatus 80 of the present embodiment and the control processing of the control apparatus 80 of the first embodiment are different from each other in a vehicle stop discharge processing. The vehicle stop discharge processing will be described as the control processing of the control apparatus 80 of the present embodiment with reference to FIG. 7.

Figure 7:
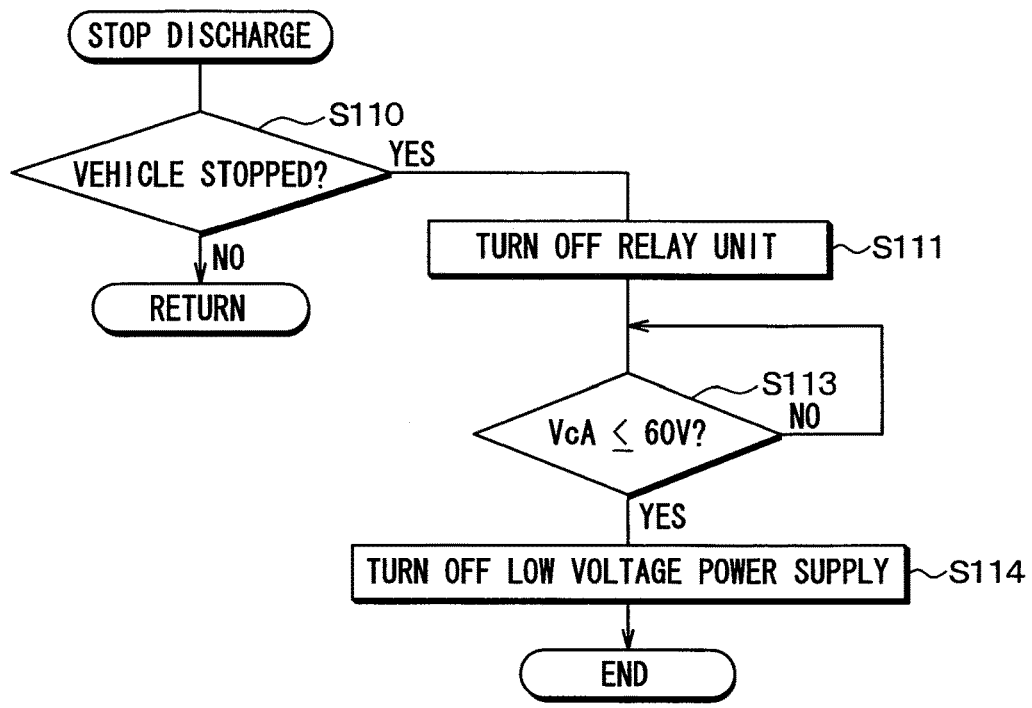
FIG. 7 is a flow chart showing a stop discharge processing of a control apparatus in FIG. 6.

The control apparatus 80 performs a stop discharge processing according to a flow chart shown in FIG. 7.

In S110, when an ignition switch IG is turned off, it is determined that an operation to stop a travelling drive source is performed to the ignition switch IG, that is, S110 is YES, the processing proceeds to S111. The relays 71, 73 of the relay unit 70 are turned off, and a connection between a high voltage power supply 3 and a smoothing capacitor 50 is released. An output voltage of the high voltage power supply 3 is not outputted to an electric device 6 and the inverter circuit 10. At this time, the discharge switching element 40 is held off. Therefore, the electric charge of the smoothing capacitors 20, 50 is discharged through the discharge resistor 100. Then, the same pieces of processing of S113 and S114 as in the first embodiment are performed.

According to the present embodiment, the discharge switching element 40, as is the case with the first embodiment, is a switching element of a normally-ON type. Thud, the same effects as the first embodiment can be obtained.

In the present embodiment, when the ignition switch IG is turned off, the electric charge of the smoothing capacitors 20, 50 is discharged through the discharge resistor 100. Therefore, when the ignition switch IG is turned off, the electric charge of the smoothing capacitors 20, 50 is not discharged by using the discharge resistor 30. When the ignition switch IG is turned off, it takes time for the smoothing capacitors 20, 50 to completely discharge their electric charge. It may be possible to reduce a frequency at which the discharge resistor 30 and the discharge switching element 40 generate heat.

Third Embodiment

In the first embodiment, the example in which it is determined whether the discharge switching element 40 is failed when the ignition switch IG is turned on is described. In addition to this, in the present embodiment, an example in which it is determined whether the discharge switching element 40 is failed when a relay unit 70 is turned on will be described.

In a control processing of the control apparatus 80 of an onboard electric system 1 of the present embodiment, a failure discharge processing is added to the control processing of the control apparatus 80 in the first embodiment. The failure discharge processing of the present embodiment will be described with reference to FIG. 8. The failure discharge processing is performed until the relay unit 70 is turned off after the start control processing is performed.

Figure 8:
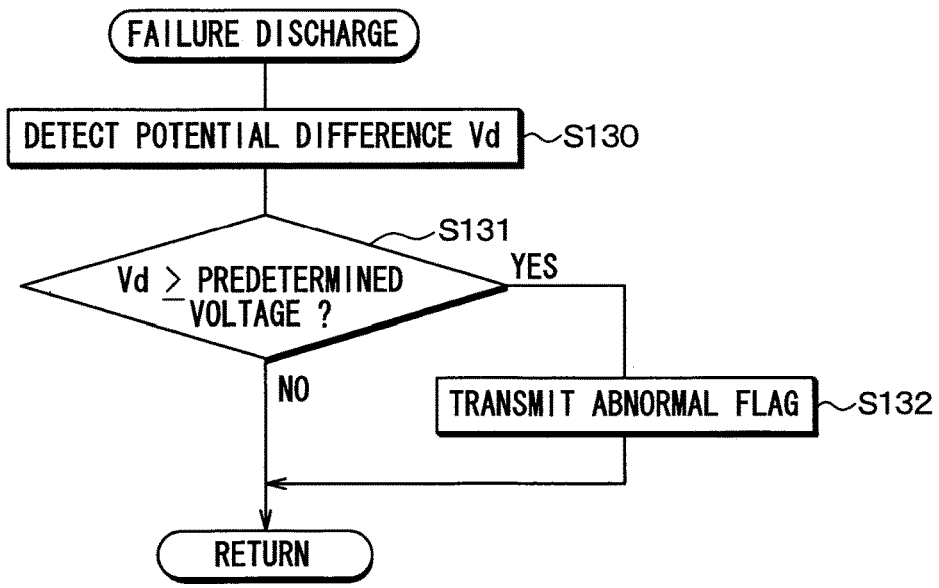
FIG. 8 is a flow chart showing a failure discharge processing in a third embodiment of the present disclosure.

The control apparatus 80 performs the failure discharge processing according to a flow chart shown in FIG. 8.

In S130, an inter-electrode voltage Vd between two electrodes of the discharge resistor 30 is detected by a voltage sensor 90. Whether current flows through the discharge resistor 30 is determined by determining whether the inter-electrode voltage Vd is greater than a specified voltage (S131). When the inter-electrode voltage Vd is less than the specified voltage, it is determined that the current does not flow through the discharge resistor 30, that is, S131 is NO. In other words, it is determined that the discharge switching element 40 is normal.

In S131, when the inter-electrode voltage Vd sensed by the voltage sensor 90 is equal to or more than the specified voltage, it is determined that the current flows through the discharge resistor 30, that is, S131 is YES. In other words, it is determined that the discharge switching element 40 is abnormal, that a positive electrode and a negative electrode of a smoothing capacitor 20 are connected to each other, and that electric charge is discharged from the smoothing capacitor 20. In this case, an abnormal signal showing the abnormal flag is outputted to the electronic control apparatus 5 (S132). The abnormal flag is a flag showing that the discharge switching element 40 is abnormal. Thus, it may be possible to notify the electronic control apparatus 5 of a message that the discharge switching element 40 is abnormal.

Fourth Embodiment

In the present embodiment, an example in which a discharge resistor 111 and a relay switch 112, which discharge electric charge of a smoothing capacitor 50, is added to the onboard electric system 1 of the first embodiment will be described. The discharge resistor 111 corresponds to a second discharge resistor.

Figure 9:
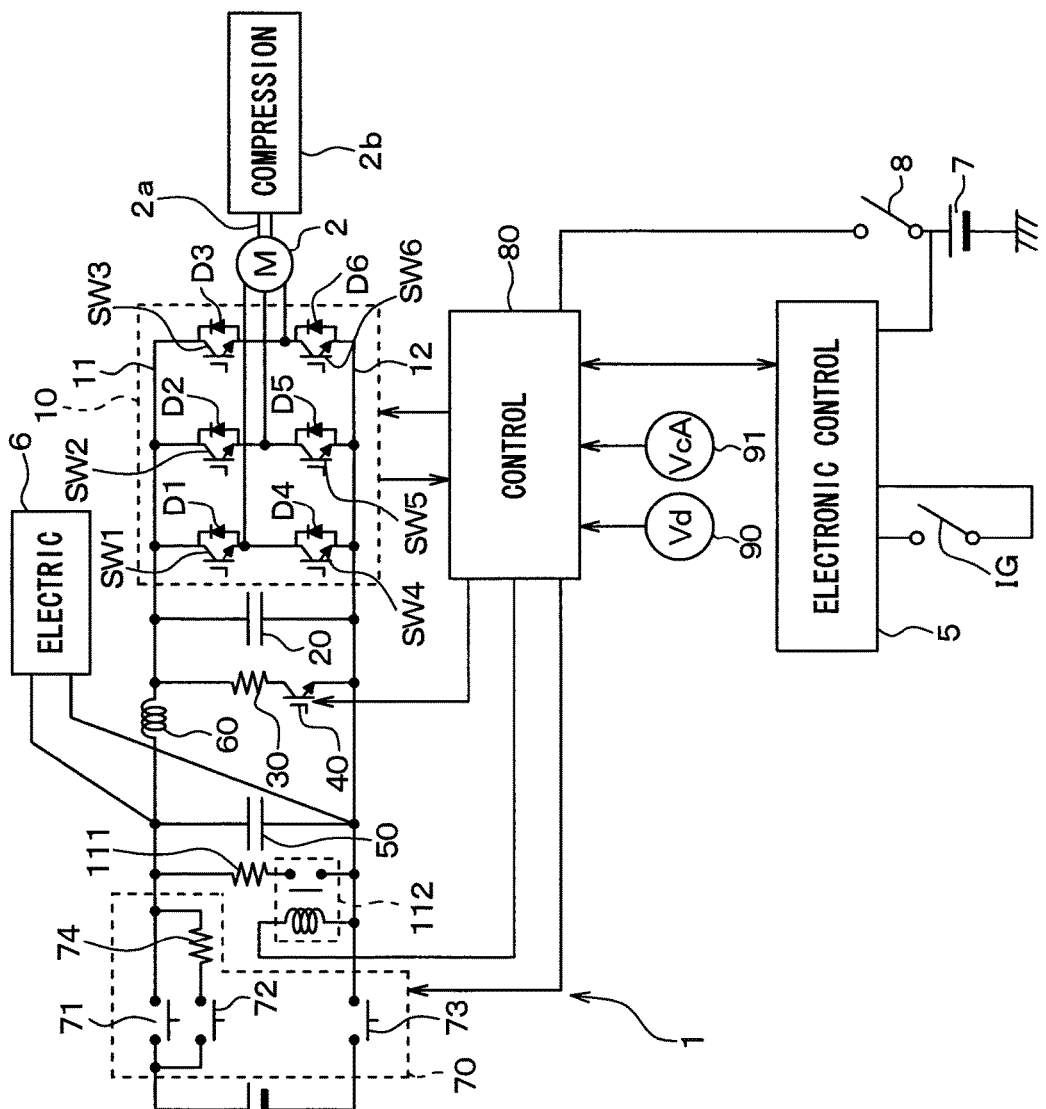
FIG. 9 is a diagram illustrating an overall configuration of an onboard electric system in a fourth embodiment of the present disclosure.

An overall configuration of an onboard electric system 1 in the present embodiment will be shown in FIG. 9.

The relay switch 112 is a contact relay which is connected in series to the discharge resistor 111 between a positive electrode and a negative electrode of the smoothing capacitor 50. The relay switch 112 and the discharge resistor 111 are arranged between the smoothing capacitor 50 and a relay unit 70. The relay switch 112 and the discharge resistor 111 are used for discharging electric charge from the smoothing capacitor 50, and may only be arranged so as to be parallel to the smoothing capacitor 50. In the present embodiment, a capacitance of the smoothing capacitor 50 is greater than a capacitance of the smoothing capacitor 20. The resistance values of the discharge resistors 30, 111 are set, so that a power consumption of the discharge resistor 111 is greater than a power consumption of the discharge resistor 30.

The power consumption of the discharge resistor 30 is power, which is consumed in the discharge resistor 30 by current flowing through the discharge resistor 30 and a discharge switching element 40 from the positive electrode side of the smoothing capacitor 20 when the discharge switching element 40 connects the positive electrode and the negative electrode of the smoothing capacitor 20.

The power consumption of the discharge resistor 111 is power, which is consumed in the discharge resistor 111 by current flowing through the relay switch 112 and the discharge resistor 111 from a positive electrode side of the smoothing capacitor 50 when the relay switch 112 connect a positive electrode and a negative electrode of the smoothing capacitor 50.

An operation of the onboard electric system 1 of the present embodiment will be described.

The present embodiment is different from the first embodiment in the stop discharge processing and the collision discharge processing. The stop discharge processing of the present embodiment will be described with reference to FIG. 10.

(Stop Discharge Processing)

Figure 10:
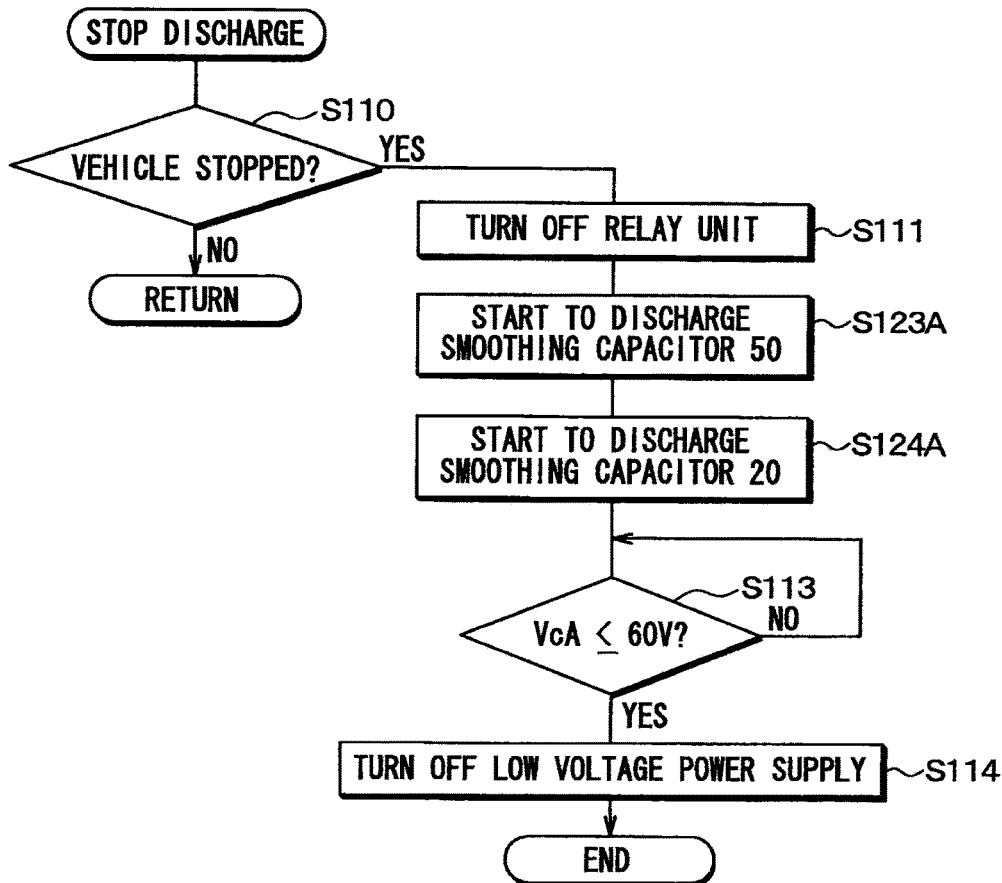
FIG. 10 is a flow chart showing a stop discharge processing of a control apparatus in FIG. 9.

The control apparatus 80 performs the stop discharge processing according to a flow chart shown in FIG. 10. The flow chart shown in FIG. 10 includes S123A and S124A in place of the S112 in the flow chart shown in FIG. 4. Therefore, when an ignition switch IG is turned off, it is determined that S110 is YES and then the processing proceeds to S111. Following this, the relay unit 70 releases the connection between the high voltage power supply 3 and the smoothing capacitor 50.

Then, in S123A, the on signal is outputted to the relay switch 112. Therefore, the relay switch 112 is turned on, and the positive electrode and the negative electrode of the smoothing capacitor 50 are connected to each other via the discharge resistor 111. Electric charge of the smoothing capacitor 50 starts to be discharged through the relay switch 112 and the discharge resistor 111.

The processing proceeds to S124A where the on signal is outputted to a discharge switching element 40. Therefore, the discharge switching element 40 is turned on so as to connect the positive electrode and the negative electrode of the smoothing capacitor 20 via the discharge resistor 30. Electric charge starts to be discharged from the smoothing capacitor 20 through the discharge switching element 40 and the discharge resistor 30. Then, as is the case with the first embodiment, pieces of processing of S113, S114 are performed.

A collision discharge processing of the present embodiment will be described with reference to FIG. 11.

(Collision Discharge Processing)

Figure 11:
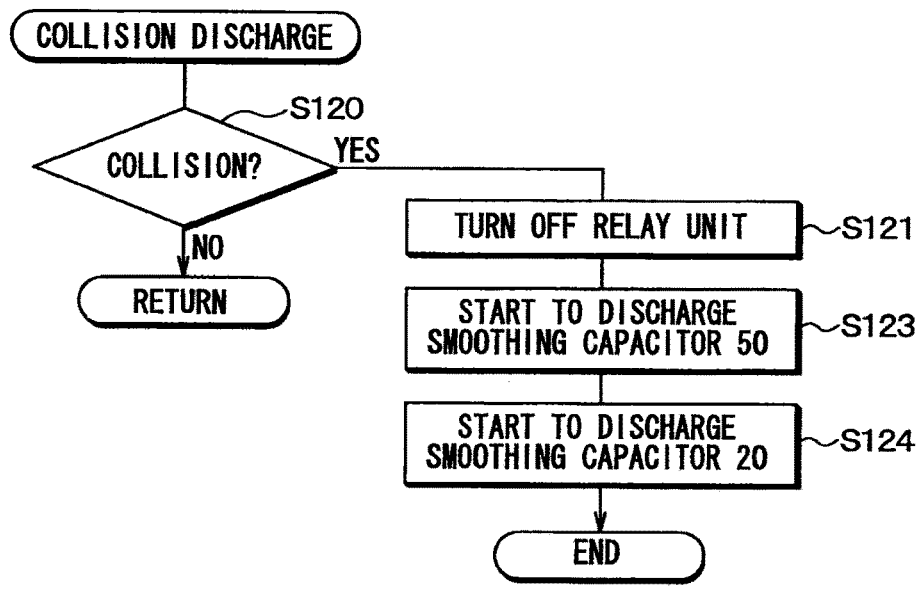
FIG. 11 is a flow chart showing a collision discharge processing of the control apparatus in FIG. 9.

The control apparatus 80 performs the collision discharge processing according to a flow chart shown in FIG. 11.

When it is determined in S120 based on an abnormal signal outputted from the electronic control apparatus 5 that a collision is caused in a vehicle, that is, S120 is YES, the processing proceeds to S122 where the off signal is outputted to the relay unit 70. Therefore, the relay unit 70 releases the connection between the smoothing capacitors 20, 50 and the high voltage power supply 3.

In S123, the on signal is outputted to the relay switch 112. Therefore, the relay switch 112 is turned on, and the positive electrode and the negative electrode of the smoothing capacitor 50 are connected to each other via the discharge resistor 111. The electric charge of the smoothing capacitor 50 starts to be discharged through the relay switch 112 and the discharge resistor 111.

The processing proceeds to S124 where the on signal is outputted to the discharge switching element 40. Therefore, the discharge switching element 40 is turned on to connect the positive electrode and the negative electrode of the smoothing capacitor 20 via the discharge resistor 30. The electric charge of the smoothing capacitor 50 starts to be discharged through the discharge switching element 40 and the discharge resistor 30.

According to the present embodiment, the discharge switching element 40, as is the case with the first embodiment, is a switching element of a normally-ON type. The same effect as the first embodiment can be produced.

In the present embodiment, a capacitance of the smoothing capacitor 50 is greater than a capacitance of the smoothing capacitor 20. The relay switch 112 is turned on and then the discharge switching element 40 is turned on. Therefore, the discharge of the smoothing capacitor 50 is started earlier than the discharge of the smoothing capacitor 20. It may be possible to restrain the electric charge of the smoothing capacitor 50 from being discharged through the discharge switching element 40 and the discharge resistor 30.

In the present embodiment, the respective resistance values of the discharge resistors 30, 111 are set so that a power consumption of the discharge resistor 111 is greater than a power consumption of the discharge resistor 30. Therefore, this further restrains the electric charge of the smoothing capacitor 50 from being discharged through the discharge switching element 40 and the discharge resistor 30.

Thus, it may be possible to reduce a heat radiation capacity of each of the discharge switching element 40 and the discharge resistor 30. It may be possible to downsize each of the discharge switching element 40 and the discharge resistor 30.

Fifth Embodiment

In the present embodiment, an example in which a relay unit 120 is added between smoothing capacitors 20, 50 to the onboard electric system 1 of the first embodiment will be described. The relay unit 120 corresponds to a second relay.

Figure 12:
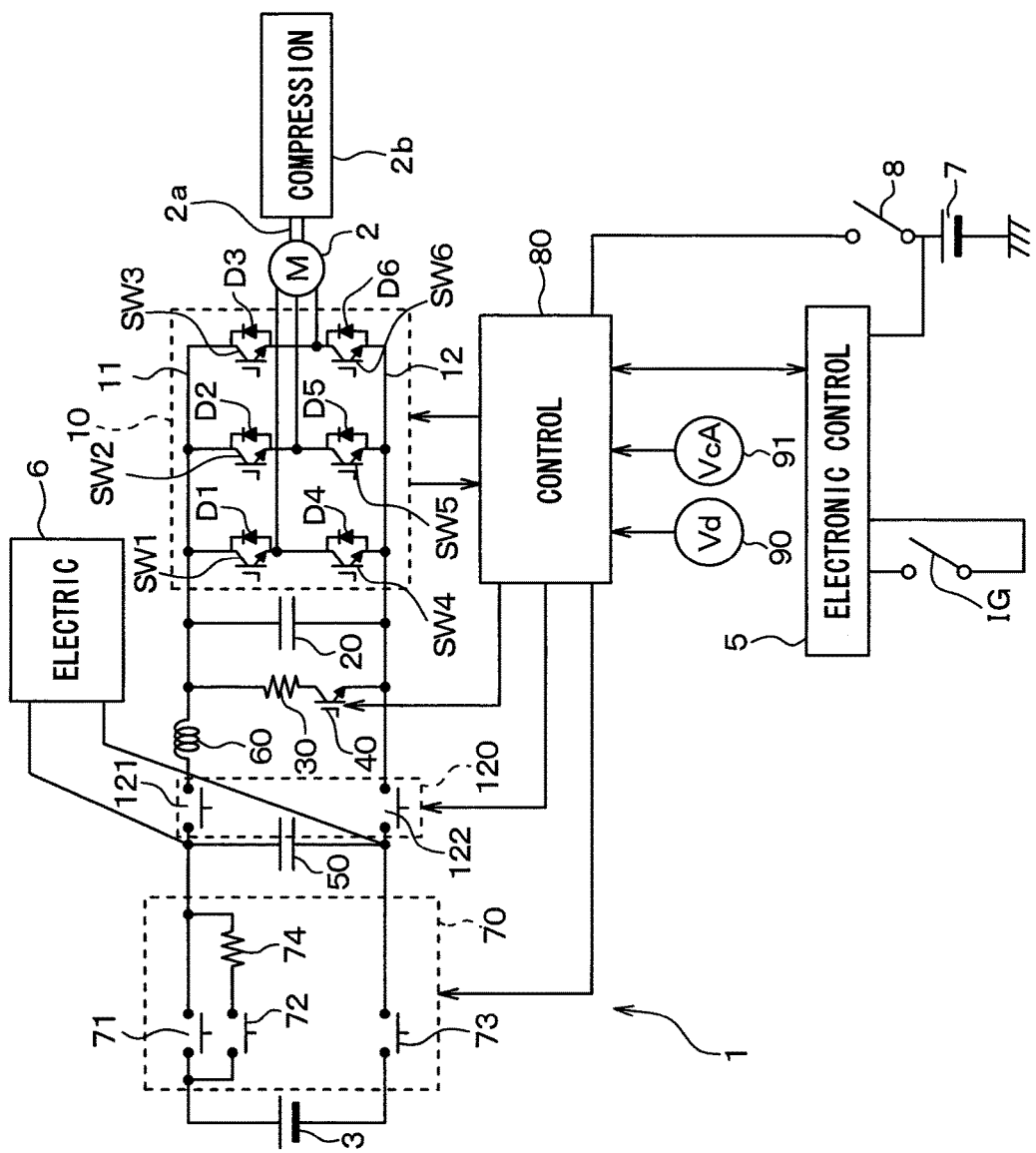
FIG. 12 is a diagram illustrating an overall configuration of an onboard electric system in a fifth embodiment of the present disclosure.

An overall configuration of an onboard electric system 1 in the present embodiment is shown in FIG. 12.

The relay unit 120 makes and releases a connection between the smoothing capacitors 20, 50. The relay unit 120 is arranged on a side closer to the smoothing capacitor 50 than the inductor 60, the discharge resistor 30, and the discharge switching element 40.

Specifically, the relay unit 120 includes relay switches 121, 122. The relay switch 121 is arranged between a positive electrode of the smoothing capacitor 50 and the inductor 60. The relay switch 122 is arranged between a negative electrode of the smoothing capacitor 20 and a negative electrode of the smoothing capacitor 50.

An operation of the onboard electric system 1 of the present embodiment will be described.

The present embodiment is different from the first embodiment in a start control processing, a stop discharge processing, and a collision discharge processing. Hereinafter, the start control processing, the stop discharge processing, and the collision discharge processing of the present embodiment will be described separately.

(Start Control Processing)

Figure 13:
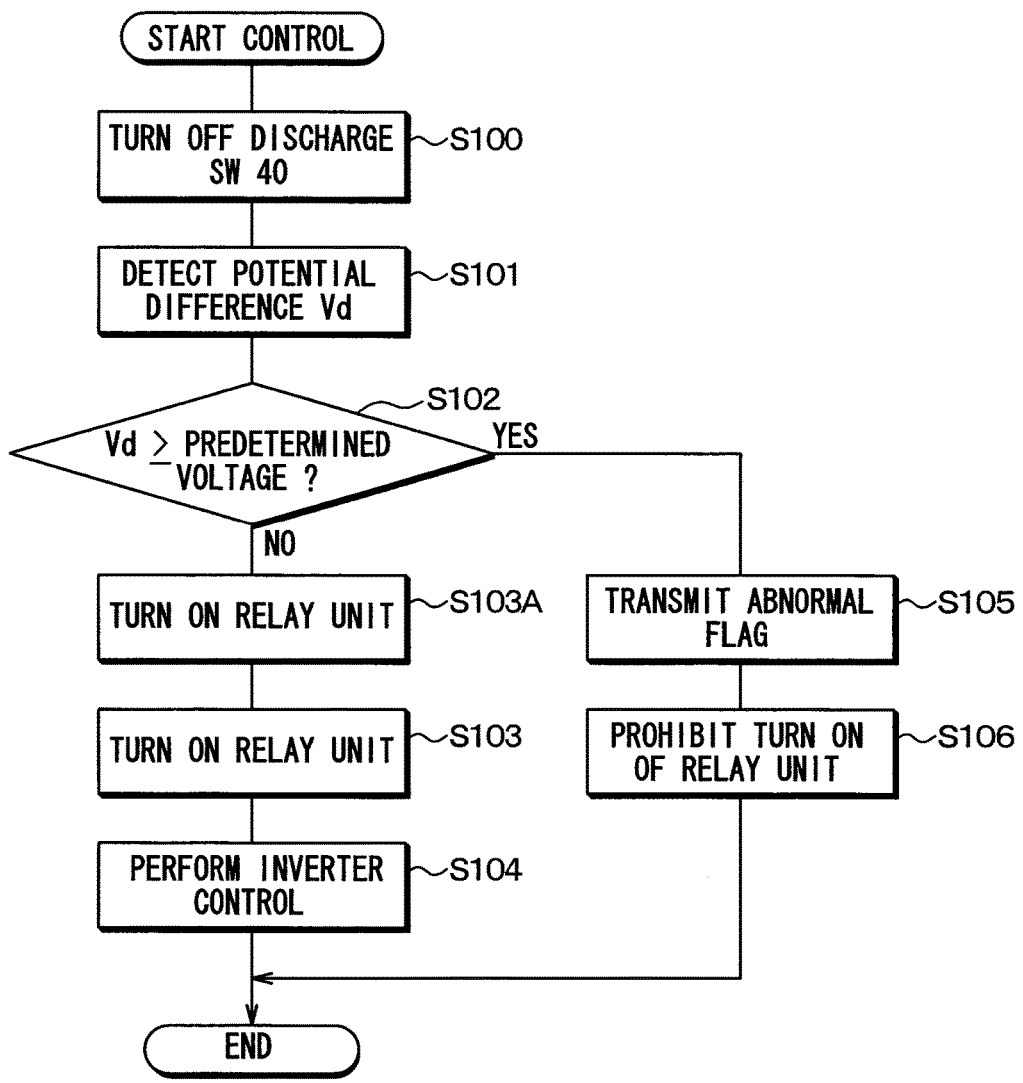
FIG. 13 is a flow chart showing a start discharge processing of a control apparatus in FIG. 12.

The control apparatus 80 performs the start control processing according to a flow chart shown in FIG. 13.

Figure 3:
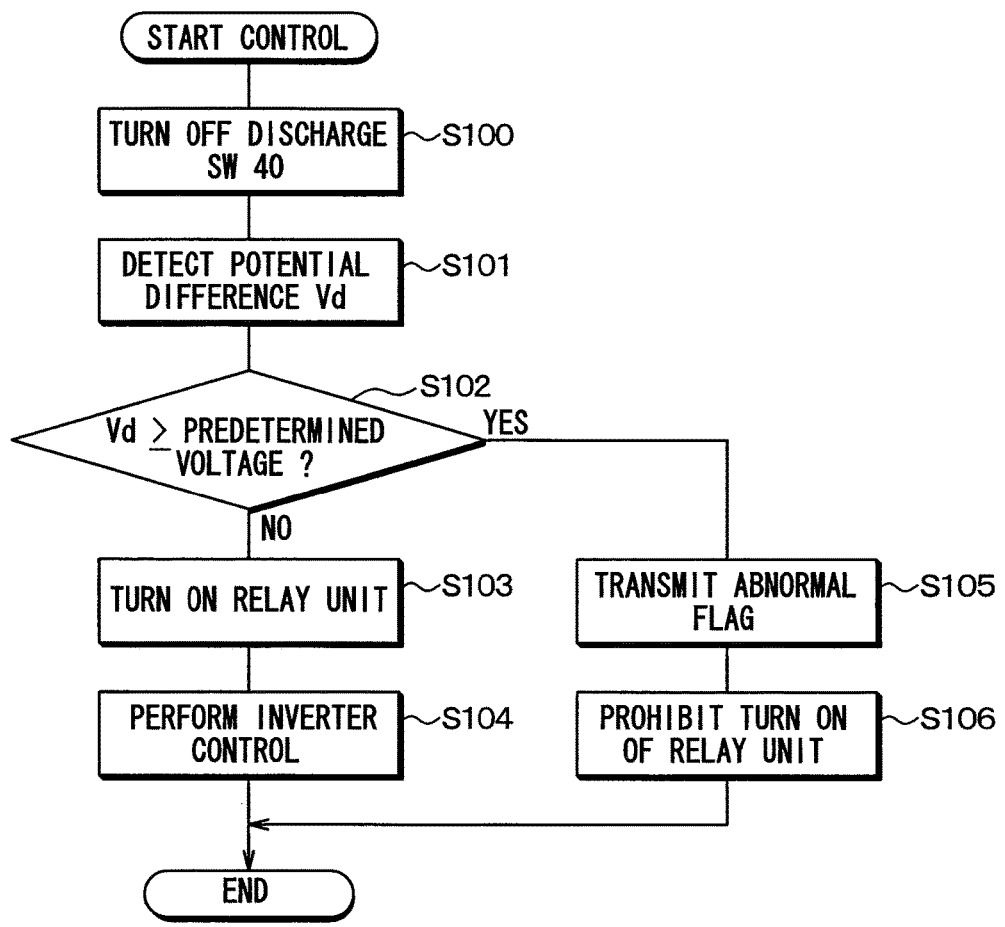
FIG. 3 is a flow chart showing a start control processing of a control apparatus in FIG. 1.

In the flow chart shown in FIG. 13, S103A is added to the flow chart shown in FIG. 3. The S103A is a step that is arranged before S103 and that turns on the relay unit 120. Therefore, the relay 120 is turned on in S103A before a relay unit 70 is turned on in S103. In other words, the smoothing capacitors 20, 50 are connected to each other by the relay unit 120 and then the smoothing capacitor 50 and the high voltage power supply 3 are connected to each other by the relay unit 70. Then, the processing proceeds to S104 where an inverter control processing is performed.

(Stop Discharge Processing)

Figure 14:
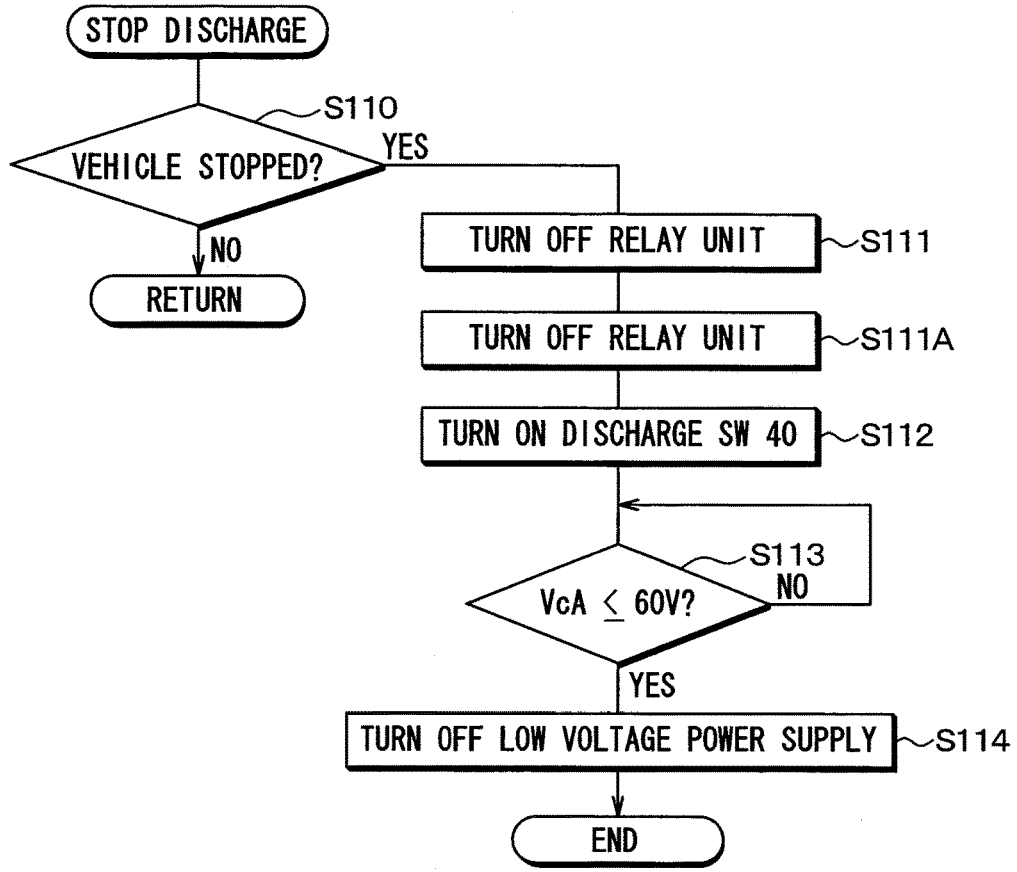
FIG. 14 is a flow chart showing a stop discharge processing of the control apparatus in FIG. 12.

The control apparatus 80 performs the stop discharge processing according to a flow chart shown in FIG. 14.

In the flow chart shown in FIG. 14, S111A is added to the flow chart shown in FIG. 4. The S111A is a step that is arranged between S111 and S112 of the flow chart shown in FIG. 14 and that turns off the relay unit 120. Therefore, the relay unit 70 is turned off in S111 and then the relay unit 120 is turned off in S111A. In other words, the connection between the smoothing capacitor 50 and the high voltage power supply 3 is released by the relay unit 70 and then the connection between the smoothing capacitors 20, 50 is released by the relay unit 120. Then, the processing proceeds to S112 where the on signal is outputted to the discharge switching element 40. Therefore, the discharge switching element 40 is turned on to connect the positive electrode and the negative electrode of the smoothing capacitor 20 via the discharge resistor 30. Therefore, the electric charge is discharged from the smoothing capacitor 20 via the discharge switching element 40 and the discharge resistor 30. The S111 and the S111A of the flow chart shown in FIG. 14 may be performed at the same time. Alternatively, the S111A may be performed and then the S111 may be performed.

(Collision Discharge Processing)

Figure 15:
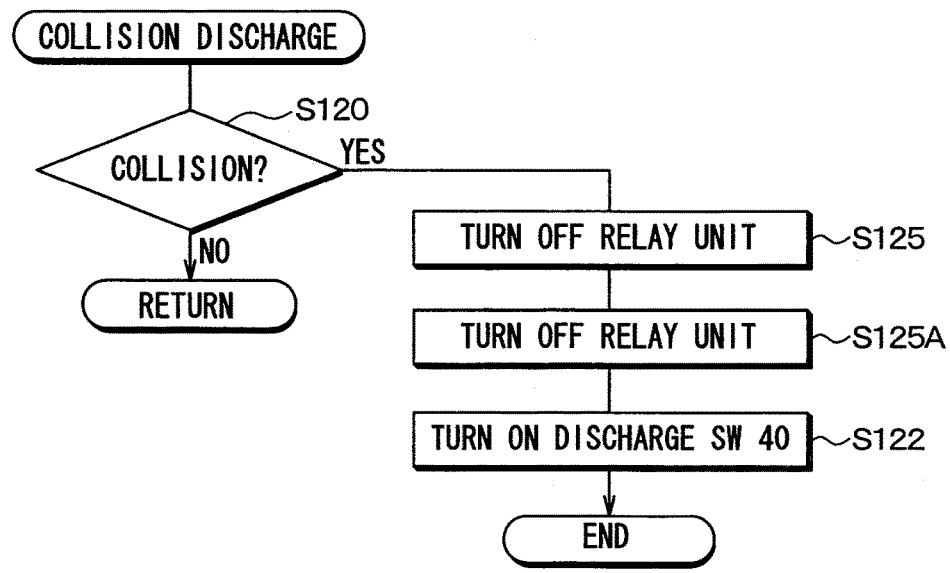
FIG. 15 is a flow chart showing a collision discharge processing of the control apparatus in FIG. 12.

The control apparatus 80 performs the collision discharge processing according to a flow chart shown in FIG. 15.

In the flow chart shown in FIG. 15, S125A is added to the flow chart shown in FIG. 5. The S125A is a step that is arranged between S125 and S122 of the flow chart shown in FIG. 15 and that turns off the relay unit 120. Therefore, the relay unit 70 is turned off in S125 and then the relay unit 120 is turned off in S125A. In other words, the connection between the smoothing capacitor 50 and the high voltage power supply 3 is released by the relay unit 70 and then the connection between the smoothing capacitors 20, 50 is released by the relay unit 120. Then, the processing proceeds to S112 where the on signal is outputted to the discharge switching element 40. Therefore, the discharge switching element 40 is turned on to connect the positive electrode and the negative electrode of the smoothing capacitor 20 via the discharge resistor 30. The S125 and the S125A of the flow chart shown in FIG. 15 may be performed at the same time. Alternatively, it is also recommended to perform the S125A and then to perform the S125.

According to the present embodiment, the discharge switching element 40, as is the case with the first embodiment, is a switching element of a normally-ON type. The same effect as the first embodiment can be produced.

In the present embodiment, in a case where a collision occurs in the vehicle, the relay unit 120 is turned off before the discharge switching element 40 is turned on. Therefore, the connection between the smoothing capacitors 20, 50 can be released before the discharge switching element 40 is turned on. In this way, the electric charge of the smoothing capacitor 50 is restrained from being discharged through the discharge switching element 40 and the discharge resistor 30. It may be possible to reduce a heat radiation capacity of each of the discharge switching element 40 and the discharge resistor 30. It may be possible to reduce in size each of the discharge switching element 40 and the discharge resistor 30.

Sixth Embodiment

In the present embodiment, an example in which a booster circuit 130, which boosts up a smoothing capacitor 50, is added to the onboard electric system 1 of the first embodiment will be described.

Figure 16:
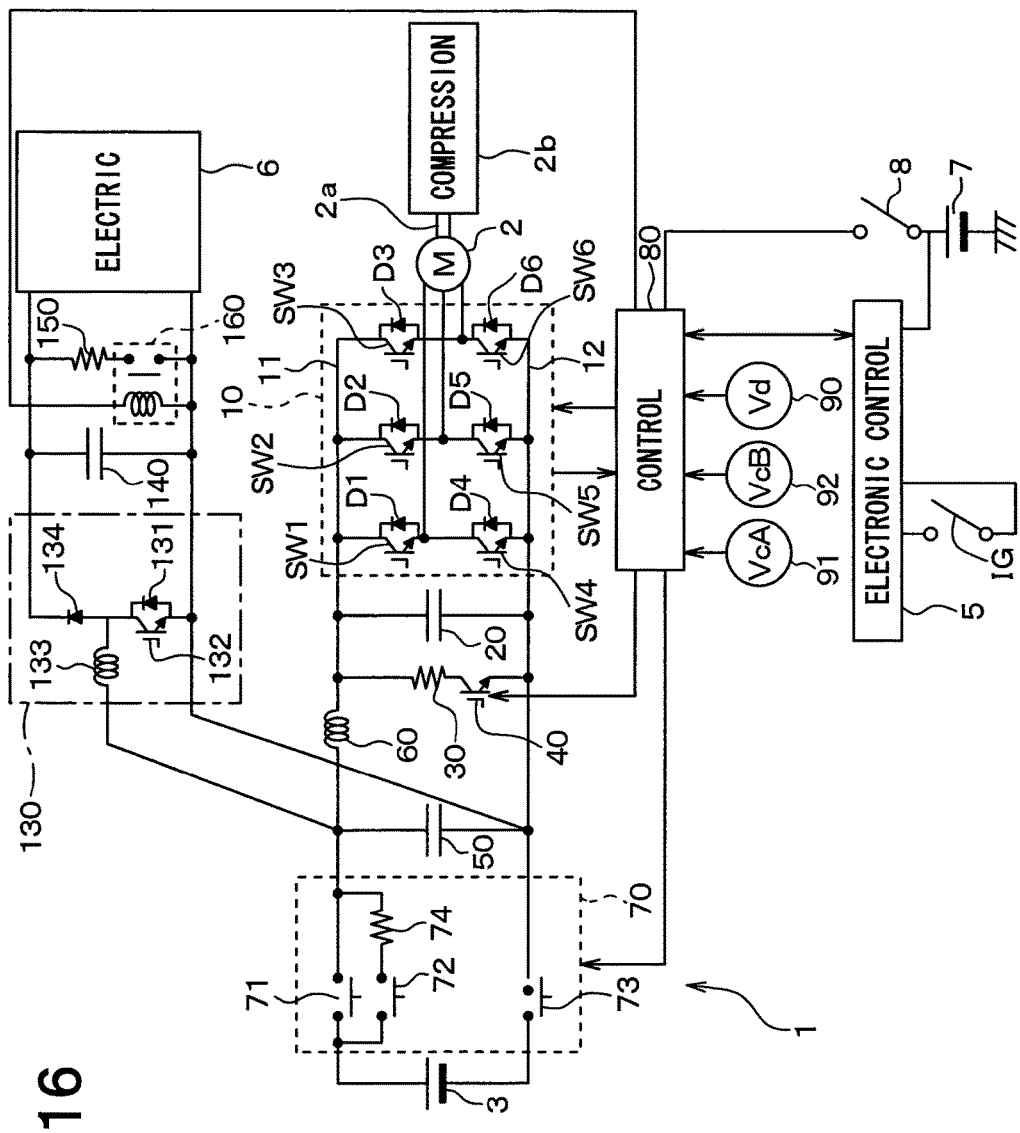
FIG. 16 is a diagram illustrating an overall configuration of an onboard electric system in a sixth embodiment of the present disclosure.

An overall configuration of an onboard electric system 1 in the present embodiment is shown in FIG. 16.

In the onboard electric system 1 of the present embodiment, the booster circuit 130, a smoothing capacitor 140, a discharge resistor 150, and a discharge relay 160 are added to the onboard electric system 1 of the present embodiment. The smoothing capacitor 140 corresponds to a third smoothing capacitor, the discharge resistor 150 corresponds to a third discharge resistor, and the discharge relay 160 corresponds to a third discharge switcher.

The booster circuit 130 is a known booster type power inverter circuit that includes a freewheeling diode 131, a switching element 132, an inductance 133, and a diode 134 and that boosts up an output voltage of the smoothing capacitor 50.

The smoothing capacitor 140 is arranged between the booster circuit 130 and an electric device 6, and stabilizes a voltage outputted between two power input electrodes of the electric device 6. The discharge resistor 150 is a resistance element connected between a positive electrode and a negative electrode of the smoothing capacitor 140. The discharge relay 160 is connected in series to the discharge resistor 150 between the positive electrode and the negative electrode of the smoothing capacitor 140. A contact relay or a semiconductor device can be used as the discharge relay 160 of the present embodiment.

The onboard electric system 1 of the present embodiment includes voltage sensors 91, 92. The voltage sensor 91 detects a voltage VcA between the positive electrode and the negative electrode of the smoothing capacitor 20. The voltage sensor 92 detects a voltage VcB between the positive electrode and the negative electrode of the smoothing capacitor 140.

An outline of an operation of the present embodiment will be described.

Relays 71, 73 of the relay unit 70 are turned on, and then the high voltage power supply 3 outputs the output voltage to the smoothing capacitors 20, 50. The smoothing capacitor 20 stabilizes a voltage between the positive electrode bus 11 and the negative electrode bus 12 of the inverter circuit 10. The smoothing capacitor 50 stabilizes a voltage between two power input electrodes of the electric device 6. Then, the inverter circuit 10, as is the case with the first embodiment, drives the three-phase AC motor 2 according to the control signal from the control apparatus 80.

At this time, in the booster circuit 130, the switching element 132 is repeatedly turned on and off by a control circuit (not shown). When the switching element 132 is on, current flows from a positive electrode of the smoothing capacitor 50 through the inductor 133 and the switching element 132. When the switching element 132 is turned off, current flows from the inductor 133 to the positive electrode of the smoothing capacitor 140 through the diode 134 by magnetic energy stored in the inductor 133 based on the current.

When the switching element 132 is repeatedly turned on and off in this manner, the electric charge of the smoothing capacitor 50 can be moved to the smoothing capacitor 140 via the inductor 133. Thus, the output voltage of the smoothing capacitor 50 is boosted up and is outputted to the smoothing capacitor 140. Then, the boosted-up voltage is stabilized by the smoothing capacitor 140. The stabilized voltage is outputted between two power input electrodes of the electric device 6. The electric device 6 is operated based on the output voltage of the smoothing capacitor 140.

A control processing of a control apparatus 80 of the present embodiment will be described.

The control processing of the control apparatus 80 of the present embodiment is different from the control processing of the control apparatus 80 of the first embodiment in a stop discharge processing and a collision discharge processing. The stop discharge processing and the collision discharge processing of the present embodiment will be described separately.

(Stop Discharge Processing)

Figure 17:
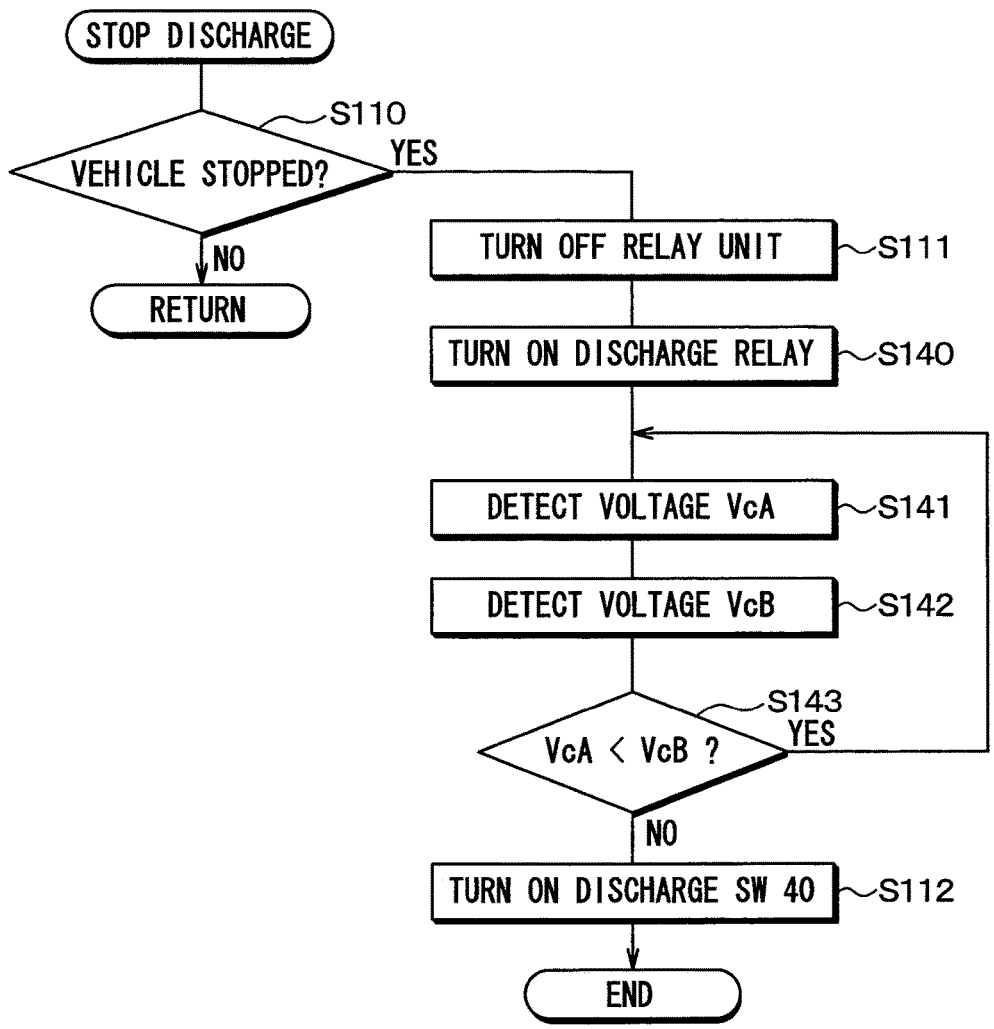
FIG. 17 is a flow chart showing a stop discharge processing of a control apparatus in FIG. 16.

The control apparatus 80 performs the stop discharge processing according to a flow chart shown in FIG. 17.

When an ignition switch IG is turned off, it is determined in S110 that an operation for stopping the travelling drive source is performed to the ignition switch IG, that is, S110 is YES. Then, in the S111, the relay unit 70 is turned off. Accordingly, a connection between the high voltage power supply 3 and the smoothing capacitor 50 is released.

In S140, the on signal is outputted to the discharge relay 160. Therefore, the discharge relay 160 is turned on. In this way, the positive electrode and the negative electrode of the smoothing capacitor 140 are connected to each other via the discharge resistor 150. The smoothing capacitor 140 starts to discharge its electric charge via the discharge resistor 150 and the discharge relay 160. A voltage between the positive electrode and the negative electrode of the smoothing capacitor 140 is reduced as time passes.

In the S141, a voltage VcA between the positive electrode and the negative electrode of the smoothing capacitor 20 is detected by the voltage sensor 91. In the S142, a voltage VcB between the positive electrode and the negative electrode of the smoothing capacitor 140 is detected by the voltage sensor 92.

It is determined in S143 whether the voltage VcA between the positive electrode and the negative electrode of the smoothing capacitor 20 is larger than the voltage VcB between the positive electrode and the negative electrode of the smoothing capacitor 140.

When the voltage VcB is greater than the voltage VcA (VcA<VcB), it is determined that S130 is YES and then the processing returns to S141. The voltages VcA, VcB are detected in S141 and S142, and then the processing proceeds to S143. Therefore, as long as the voltage VcA becomes equal to the voltage VcB, the steps of S141, 142 and the YES determination of S143 are repeatedly performed.

When the voltage VcA and the voltage VcB become the same voltage, it is determined that S143 is NO. Then, the processing proceeds to S112 where the on signal is outputted to the discharge switching element 40. Therefore, the discharge switching element 40 is turned on to connect the positive electrode and the negative electrode of the smoothing capacitor 20 through the discharge resistor 30. The smoothing capacitor 20 starts to discharge its electric charge through the discharge switching element 40 and the discharge resistor 30. Then, the electric charge of the smoothing capacitor 50 is discharged through the freewheeling diode 131 of the booster circuit 130, the inductor 133, the discharge resistor 150, and the discharge relay 160.

(Collision Discharge Processing)

Figure 18:
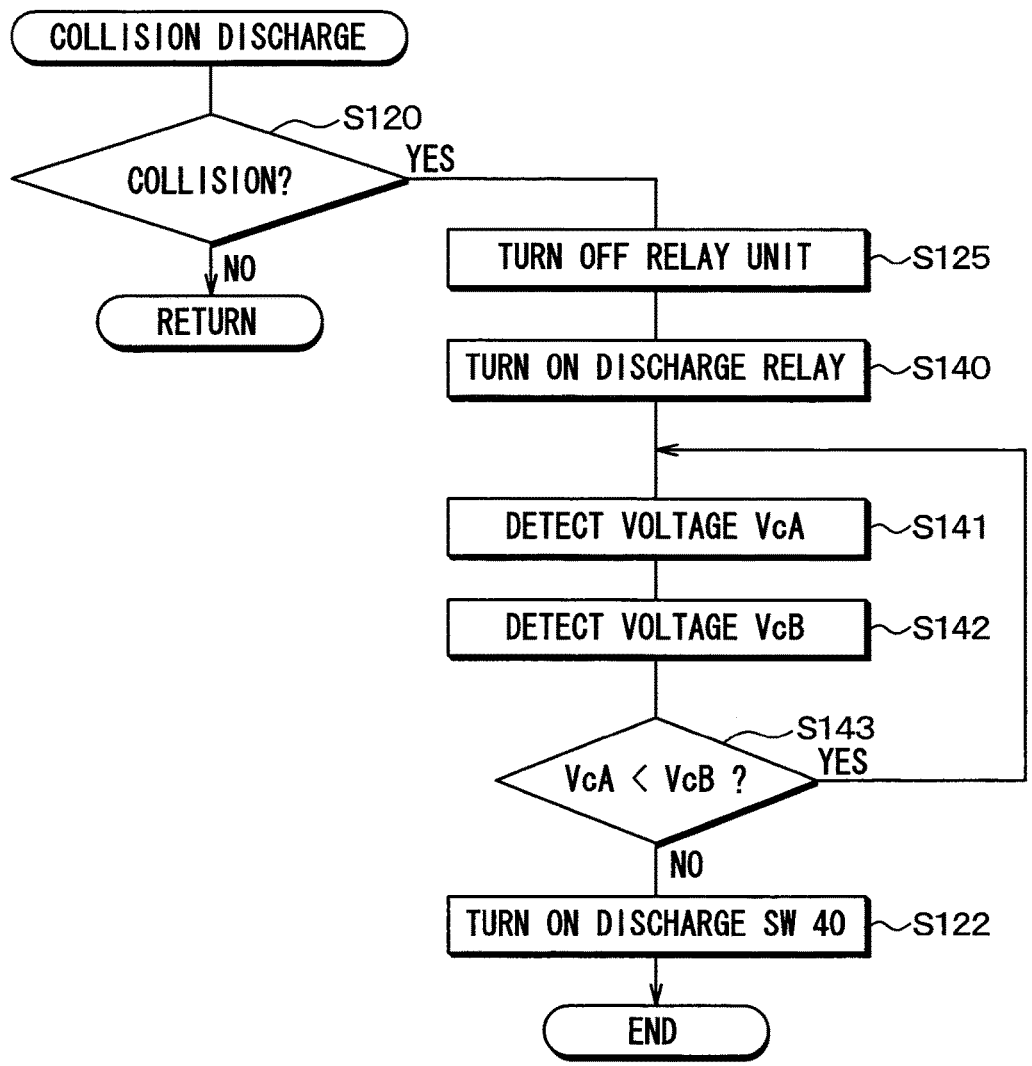
FIG. 18 is a flow chart showing a collision discharge processing of the control apparatus in FIG. 16.

The control apparatus 80 performs the collision discharge processing according to a flow chart shown in FIG. 18.

The flow chart shown in FIG. 18, in the flow chart shown in FIG. 17, uses S120 instead of S110 and uses S122 instead of S112.

The S120 is a step that determines based on an abnormal signal outputted from an electronic control apparatus 5 whether a collision happens to the vehicle. The S122, like the S112, is a step for outputting the on signal to the discharge switching element 40.

When it is determined in S120 that the collision happens to the vehicle, that is, S120 is YES, as is the case with the stop discharge processing in FIG. 17, the pieces of processing of S125, S140, S141, S142, and S143 are performed. Then, in S122, the on signal is outputted to the discharge switching element 40. The relay unit 70 is turned off and then the discharge relay 160 is turned on. Then, when the voltage VcA and the voltage VcB become the same voltage, the discharge switching element 40 is turned on to start to discharge the electric charge of the smoothing capacitor 20.

According to the present embodiment, the discharge switching element 40, as is the case with the first embodiment, is a switching element of a normally-ON type. The same effect as the first embodiment can be produced.

In the present embodiment, when the voltage VcA between the positive electrode and the negative electrode of the smoothing capacitor 20 and the voltage VcB between the positive electrode and the negative electrode of the smoothing capacitor 140 become the same voltage, the discharge switching element 40 is turned on to start to discharge the electric charge of the smoothing capacitor 20. It may be possible to restrain the electric charge of the smoothing capacitor 20 from being discharged through the discharge switching element 40 and discharge resistor 30. It may be possible to reduce the heat radiation capacity of each of the discharge switching element 40 and the discharge resistor 30. It may be possible to reduce in size each of the discharge switching element 40 and the discharge resistor 30.

Other Embodiments

In the fourth embodiment, the example in which the capacitance of the smoothing capacitor 50 is greater than the capacitance of the smoothing capacitor 20 is described. Instead of this case, the capacitance of the smoothing capacitor 20 may be greater than the capacitance of the smoothing capacitor 50. In this case, the resistance value of each of the discharge resistors 30, 111 may be set so that the power consumption of the discharge resistor 111 is larger than the power consumption of the discharge resistor 30.

In a case where the capacitance of the smoothing capacitor 20 is greater than the capacitance of the smoothing capacitor 50, the control processing of the control apparatus 80 may be performed in the following manners (a), (b).

(a) In the stop discharge processing shown in FIG. 10, after the S111, the discharge switching element 40 is turned on in S124A to start to discharge the electric charge of the smoothing capacitor 20. The relay switch 112 is turned on in S123A. Therefore, the smoothing capacitor 50 is caused to start discharging its electric charge.

(b) In the collision discharge processing shown in FIG. 11, as is the case with (a), after the S122, the electric charge of the smoothing capacitor 20 is caused to start discharging its electric charge in S124 and then the smoothing capacitor 50 is caused to start discharging its electric charge in S123.

In the sixth embodiment, the example in which a voltage determiner determines in S143 whether the voltage between the positive electrode and the negative electrode of the smoothing capacitor 20 is equal to the voltage between the positive electrode and the negative electrode of the smoothing capacitor 140 is described. In place of this, the voltage determiner may determine whether the voltage between the positive electrode and the negative electrode of the smoothing capacitor 50 is equal to the voltage between the positive electrode and the negative electrode of the smoothing capacitor 140.

The first embodiment describes the example in which the threshold value (that is, the specified value) of the voltage VcA between the positive electrode and the negative electrode of the smoothing capacitor 20, which is used for stopping the output voltage of the low voltage power supply 7 from being applied to the control apparatus 80, is set to 60 V. However, the threshold value of the voltage VcA is not limited to this. A voltage value equal to or less than 60 V, for example, 0 V may be used as the threshold value.

In the first to the sixth embodiments, the example in which whether the abnormal state happens to the vehicle is determined in S120 by determining whether the collision occurs to the vehicle is described. However, whether the abnormal state happens to the vehicle may be determined by determining whether an abnormality other than the collision happens to the vehicle.

In the first to the sixth embodiment, the example in which it is determined in S102 based on the inter-electrode voltage Vd of the discharge resistor 30 whether the discharge switching element 40 is normal is described. A sensing resistance element may be connected in series to the discharge resistor 30 between the positive electrode and the negative electrode of the smoothing capacitor 20, and it may be determined whether the discharge switching element 40 is normal based on an inter-electrode voltage Vd between two electrodes of the sensing resistance element. Alternatively, a current sensor may be employed in order to sense current flowing through a wiring, which is connected between the positive electrode and the negative electrode of the smoothing capacitor 20 through the discharge switching element 40, determining whether the discharge switching element 40 is normal according to the detection value of the current sensor.

In the first to the sixth embodiments, the example in which the synchronous AC motor is used as the electric motor relating to the present disclosure is described. However, an induction AC motor may be used. The AC current outputted to the motor from the inverter circuit 10 is not limited to three-phase AC currents, and the AC current may be AC currents of two phases or four or more phases. The AC motor relating to the present disclosure is not limited to the three-phase AC motor but may be an N ($\neq 3$)-phase AC motor. Further, in the first to the sixth embodiments, a DC motor may be used as the electric motor relating to the present disclosure in place of the AC motor.

The fourth embodiment describes the example in which the contact relay is used as the relay switch 112 but, in place of this, a semiconductor device may be used as the relay switch 112.

The sixth embodiment describes the example in which the contact relay is used as the discharge relay 160 but, in place of this, a semiconductor device may be used as the discharge relay 160.

Incidentally, the present disclosure is not limited to the embodiments but can be modified as appropriate within a scope described in the scope of the claims. Further, the respective embodiments are not related to each other but can be combined as appropriate with each other except a case where it is clear that the respective embodiments cannot be combined with each other. Specifically, any one of the second, the fourth, and the fifth embodiments may be combined with the third embodiment. Any two of the fourth, the fifth, and the sixth embodiments may be combined with each other.

The relationship between the constructions of the first to the sixth embodiments and constructions in the scope of the claims will be shown in the following.

S104 corresponds to a drive signal generator. The S100 corresponds to an off-signal generator. The S120 corresponds to an abnormality determiner. S122 and S124 correspond to a first on-signal generator. The relay unit 70 corresponds to a first relay. The ignition switch IG corresponds to a starting switch. The S103 corresponds to a power supply turning-on controller. The S110 corresponds to a stop operation determiner. The S111 corresponds to a power supply turning-off controller. S112 and S124A correspond to a second on-signal generator. The S110 corresponds to a stop operation determiner. The S111 corresponds to a power supply turning-off controller. S102 and S131 correspond to a failure determiner. The S112 corresponds to a second discharge switcher. The S123 corresponds to a discharge control signal generator. S125A and S111A correspond to a relay turning-off controller. The S140 corresponds to a third on-signal generator. The S143 corresponds to a voltage determiner.

An onboard electric system according to one mode of the present disclosure comprises: a drive circuit that drives an electric motor mounted to a vehicle based on an output voltage of a DC power supply; a first smoothing capacitor that stabilizes the output voltage applied between two power input electrodes of the drive circuit from the DC power supply; a drive signal generator that outputs to the drive circuit, a control signal controlling the drive circuit, causing the electric motor to be driven based on the output voltage of the DC power supply; a first discharge resistor that is connected between a positive electrode and a negative electrode of the first smoothing capacitor; a first discharge switcher that is connected in series to the first discharge resistor between the positive electrode and the negative electrode of the first smoothing capacitor, and releases or makes a connection between the positive electrode and the negative electrode of the first smoothing capacitor; and an off-signal generator that outputs to the first discharge switcher, an off signal causing the first discharge switcher to release the connection between the positive electrode and the negative electrode of the first smoothing capacitor. The first discharge switcher is provided by a switcher of a normally-ON type that makes the connection between the positive electrode and the negative electrode of the first smoothing capacitor through the first discharge resistor in a period other than a period while the off-signal generator provides the off signal.

According to the present disclosure, when an abnormal state happens and the off signal is not given from the off-signal generator to the first discharge switcher, the first discharge switcher automatically connects the positive electrode and the negative electrode of the first smoothing capacitor through the first discharge resistor. When the abnormal state happens, it may be possible to discharge the electric charge from the first smoothing capacitor.

It is noted that a flowchart or the processing of the flowchart in the present application includes multiple steps (also referred to as sections), each of which is represented, for instance, as S100. Further, each step can be divided into several sub-steps while several steps can be combined into a single step. Furthermore, each step can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:
1. An onboard electric system comprising:
a drive circuit that drives an electric motor mounted to a vehicle based on an output voltage of a direct current power supply;
a first smoothing capacitor that stabilizes the output voltage applied between two power input electrodes of the drive circuit from the direct current power supply;
a drive signal generator that outputs to the drive circuit, a control signal controlling the drive circuit, causing the electric motor to be driven based on the output voltage of the direct current power supply;
a first discharge resistor that is connected between a positive electrode and a negative electrode of the first smoothing capacitor;
a first discharge switcher that is connected in series to the first discharge resistor between the positive electrode and the negative electrode of the first smoothing capacitor, and releases or makes a connection between the positive electrode and the negative electrode of the first smoothing capacitor;
an off-signal generator that outputs to the first discharge switcher, an off signal causing the first discharge switcher to release the connection between the positive electrode and the negative electrode of the first smoothing capacitor;
an abnormality determiner that determines whether an abnormal state happens to the vehicle;
a first on-signal generator that outputs an on signal controlling the first discharge switcher to the first discharge switcher, the on signal causing to make the connection between the positive electrode and the negative electrode of the first smoothing capacitor when the abnormality determiner determines that the abnormal state happens to the vehicle;
a first relay that makes or releases a connection between the first smoothing capacitor, the drive circuit, the first discharge resistor and the first discharge switcher, and the direct current power supply;
a power supply turning-on controller that makes the connection between the first smoothing capacitor, the drive circuit, the first discharge resistor and the first discharge switcher, and the direct current power supply by the first relay after the off-signal generator outputs the off signal to the first discharge switcher, when an operation starting a travelling drive source of the vehicle is performed to a starting switch starting the travelling drive source;
a stop operation determiner that determines whether an operation stopping the travelling drive source is performed to the starting switch;
a power supply turning-off controller that releases the connection between the first smoothing capacitor, the drive circuit, the first discharge resistor and the first discharge switcher, and the direct current power supply by the first relay; and
a second on-signal generator that outputs an on signal controlling the first discharge switcher to the first discharge switcher, the on signal causing to make the connection between the positive electrode and the negative electrode of the first smoothing capacitor,
wherein:
the first discharge switcher is provided by a switcher of a normally-ON type that makes the connection between the positive electrode and the negative electrode of the first smoothing capacitor through the first discharge resistor in a period other than a period while the off-signal generator provides the off signal, when the stop operation determiner determines that the operation stopping the travelling drive source is performed to the starting switch, the second on-signal generator outputs the on signal to the first discharge switcher after the power supply turning-off controller releases the connection between the first smoothing capacitor, the drive circuit, the first discharge resistor and the first discharge switcher, and the direct current power supply by the first relay.

2. The onboard electric system according to claim 1, wherein:

the abnormality determiner determines whether the abnormal state happens to the vehicle by determining whether the vehicle collides.

3. An onboard electric system comprising:

a drive circuit that drives an electric motor mounted to a vehicle based on an output voltage of a direct current power supply:

a first smoothing capacitor that stabilizes the output voltage applied between two power input electrodes of the drive circuit from the direct current power supply;

a drive signal generator that outputs to the drive circuit, a control signal controlling the drive circuit, causing the electric motor to be driven based on the output voltage of the direct current power supply;

a first discharge resistor that is connected between a positive electrode and a negative electrode of the first smoothing capacitor;

a first discharge switcher that is connected in series to the first discharge resistor between the positive electrode and the negative electrode of the first smoothing capacitor, and releases or makes a connection between the positive electrode and the negative electrode of the first smoothing capacitor;

an off-signal generator that outputs to the first discharge switcher, an off signal causing the first discharge switcher to release the connection between the positive electrode and the negative electrode of the first smoothing capacitor;

an abnormality determiner that determines whether an abnormal state happens to the vehicle;

a first on-signal generator that outputs an on signal controlling the first discharge switcher to the first discharge switcher, the on signal causing to make the connection between the positive electrode and the negative electrode of the first smoothing capacitor when the abnormality determiner determines that the abnormal state happens to the vehicle;

a first relay that makes or releases a connection between the first smoothing capacitor, the drive circuit, the first discharge resistor and the first discharge switcher, and the direct current power supply;

a power supply turning-on controller that makes the connection between the first smoothing capacitor, the drive circuit, the first discharge resistor and the first discharge switcher, and the direct current power supply by the first relay after the off-signal generator outputs the off signal to the first discharge switcher, when an operation starting a travelling drive source of the vehicle is performed to a starting switch starting the travelling drive source;

a stop operation determiner that determines whether an operation stopping the travelling drive source is performed to the starting switch;

a power supply turning-off controller that releases the connection between the first smoothing capacitor, the drive circuit, the first discharge resistor and the first discharge switcher, and the direct current power supply by the first relay; and a resistance element that is placed parallel to the first discharge resistor between the positive electrode and the negative electrode of the first smoothing capacitor, wherein:

the first discharge switcher is provided by a switcher of a normally-ON type that makes the connection between the positive electrode and the negative electrode of the first smoothing capacitor through the first discharge resistor in a period other than a period while the off-signal generator provides the off signal, a time constant of a closed circuit including the first smoothing capacitor and the resistance element is greater than a time constant of a closed circuit including the first smoothing capacitor, the first discharge switcher, and the first discharge resistor;

when the stop operation determiner determines that the operation stopping the travelling drive source to the starting switch is performed, electric charge supplied from the first smoothing capacitor is discharged through the resistance element while the first discharge switcher releases the connection between the positive electrode and the negative electrode of the first smoothing capacitor after the power supply turning-off controller releases the connection between the first smoothing capacitor, the drive circuit, the first discharge resistor and the first discharge switcher, and the direct current power supply by the first relay.

4. The onboard electric system according to claim 1, further comprising:

a failure determiner that determines whether current flows between the positive electrode and the negative electrode of the first smoothing capacitor through the first discharge resistor and the first discharge switcher when the off-signal generator outputs the off signal to the first discharge switcher, and determines whether the first discharge switcher is out of order or not.

5. The onboard electric system according to claim 4, further comprising:

a voltage sensor that detects a voltage between two electrodes of the first discharge resistor, wherein:

the failure determiner determines whether the current flows between the positive electrode and the negative electrode of the first smoothing capacitor by determining whether a detection voltage of the voltage sensor is equal to or more than a threshold value.

6. The onboard electric system according to claim 1, wherein:

the first discharge switcher is provided by a semiconductor device of a normally-ON type.

7. The onboard electric system according to claim 1, further comprising:

an electric device that is placed between a positive electrode and a negative electrode of the direct current power supply, and operates based on the output voltage of the direct current power supply;

a second smoothing capacitor that stabilizes a voltage applied between two direct current power input electrodes of the electric device from the direct current power supply;

a second discharge resistor that is connected between a positive electrode and a negative electrode of the second smoothing capacitor; and a second discharge switcher that is connected in series to the second discharge resistor between the positive electrode and the negative electrode of the second smoothing capacitor, and releases or makes a connection between the positive electrode and the negative electrode of the second smoothing capacitor, wherein:

when a capacitance of the first smoothing capacitor is greater than a capacitance of the second smoothing capacitor, a resistance value of the first discharge resistor and a resistance value of the second discharge resistor are set, causing a power consumption of the first discharge resistor to be greater than a power consumption of the second discharge resistor; and when the capacitance of the second smoothing capacitor is greater than the capacitance of the first smoothing capacitor, the resistance value of the first discharge resistor and the resistance value of the second discharge resistor are set, causing the power consumption of the second discharge resistor to be greater than the power consumption of the first discharge resistor.

8. The onboard electric system according to claim 7, further comprising:

a discharge control signal generator that outputs to the second discharge switcher, an on signal making the connection between the positive electrode and the negative electrode of the second smoothing capacitor by the second discharge switcher, wherein:

when the capacitance of the first smoothing capacitor is greater than the capacitance of the second smoothing capacitor, the discharge control signal generator outputs the on signal to the second discharge switcher after the first on-signal generator outputs the on signal to the first discharge switcher; and when the capacitance of the second smoothing capacitor is greater than the capacitance of the first smoothing capacitor, the first on-signal generator outputs the on signal to the first discharge switcher after the discharge control signal generator outputs the on signal to the second discharge switcher.

9. The onboard electric system according to claim 8, wherein:

when the capacitance of the first smoothing capacitor is greater than the capacitance of the second smoothing capacitor, the discharge control signal generator outputs the on signal to the second discharge switcher after the second on-signal generator outputs the on signal to the first discharge switcher; and when the capacitance of the second smoothing capacitor is greater than the capacitance of the first smoothing capacitor, the discharge control signal generator outputs the on signal to the second discharge switcher before the second on-signal generator outputs the on signal to the first discharge switcher.

10. The onboard electric system according to claim 1, further comprising:

an electric device that is placed between a positive electrode and a negative electrode of the direct current power supply, and operates based on the output voltage of the direct current power supply;

a second smoothing capacitor that stabilizes a voltage applied between two direct current power input electrodes of the electric device from the direct current power supply;

a second relay that releases or makes a connection between the first smoothing capacitor and the second smoothing capacitor; and a relay turning-off controller that releases the connection between the first smoothing capacitor and the second smoothing capacitor by the second relay, wherein:

before the first on-signal generator outputs the on signal to the first discharge switcher, the relay turning-off controller releases the connection between the first smoothing capacitor and the second smoothing capacitor by the second relay.

11. The onboard electric system according to claim 10, wherein:

before the second on-signal generator outputs the on signal to the first discharge switcher, the relay turning-off controller releases the connection between the first smoothing capacitor and the second smoothing capacitor by the second relay.

12. The onboard electric system according to claim 1, further comprising:

an electric device that is placed between a positive electrode and a negative electrode of the direct current power supply, and operates based on the output voltage of the direct current power supply;

a second smoothing capacitor that stabilizes a voltage applied between two direct current power input electrodes of the electric device from the direct current power supply;

a booster circuit that boosts up a voltage between a positive electrode and a negative electrode of the second smoothing capacitor;

a third smoothing capacitor that stabilizes the voltage boosted up by the booster circuit;

a third discharge resistor that is connected between a positive electrode and a negative electrode of the third smoothing capacitor;

a third discharge switcher that is connected in series to the third discharge resistor between the positive electrode and the negative electrode of the third smoothing capacitor, and releases or makes a connection between the positive electrode and the negative electrode of the third smoothing capacitor;

a third on-signal generator that outputs to the third discharge switcher, an on signal causing the third discharge switcher to make a connection between the positive electrode and the negative electrode of the third smoothing capacitor; and a voltage determiner that determines whether a voltage between the positive electrode and the negative electrode of any one of the first smoothing capacitor and the second smoothing capacitor is equal to a voltage between the positive electrode and the negative electrode of the third smoothing capacitor, wherein:

the electric device operates based on the voltage between the positive electrode and the negative electrode of the third smoothing capacitor; and when the abnormality determiner determines that an abnormal state happens to the vehicle, and when the voltage determiner determines that the voltage between the positive electrode and the negative electrode of the one of the first smoothing capacitor and the second smoothing capacitor is equal to the voltage between the positive electrode and the negative electrode of the third smoothing capacitor after the third on-signal generator outputs an on signal to the third discharge switcher, the first on-signal generator outputs the on signal to the first discharge switcher.

13. The onboard electric system according to claim 12, wherein:

when the stop operation determiner determines that an operation stopping the travelling drive source is performed to the starting switch, and when the voltage determiner determines that the voltage between the positive electrode and the negative electrode of the one of the first smoothing capacitor and the second smoothing capacitor is equal to the voltage between the positive electrode and the negative electrode of the third smoothing capacitor after the third on-signal generator outputs an on signal to the third discharge switcher, the second on-signal generator outputs the on signal to the first discharge switcher.

14. The onboard electric system according to claim 3, wherein:

the abnormality determiner determines whether the abnormal state happens to the vehicle by determining whether the vehicle collides.

15. The onboard electric system according to claim 3, further comprising:

a failure determiner that determines whether current flows between the positive electrode and the negative electrode of the first smoothing capacitor through the first discharge resistor and the first discharge switcher when the off-signal generator outputs the off signal to the first discharge switcher, and determines whether the first discharge switcher is out of order or not.

16. The onboard electric system according to claim 15, further comprising:

a voltage sensor that detects a voltage between two electrodes of the first discharge resistor, wherein:

the failure determiner determines whether the current flows between the positive electrode and the negative electrode of the first smoothing capacitor by determining whether a detection voltage of the voltage sensor is equal to or more than a threshold value.

17. The onboard electric system according to claim 3, wherein:

the first discharge switcher is provided by a semiconductor device of a normally-ON type.

* * * * *